United States Patent
Hamasaki et al.

(10) Patent No.: US 7,318,508 B2
(45) Date of Patent: Jan. 15, 2008

(54) ONE-WAY ROTATIONAL TRANSFER MECHANISM

(75) Inventors: Takuji Hamasaki, Saitama (JP); Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 133 days.

(21) Appl. No.: 11/062,855

(22) Filed: Feb. 23, 2005

(65) Prior Publication Data

US 2005/0183917 A1    Aug. 25, 2005

(30) Foreign Application Priority Data

Feb. 23, 2004   (JP) ............................. 2004-046641

(51) Int. Cl.
*F16D 41/066* (2006.01)
(52) U.S. Cl. .......................................... 192/38; 192/44
(58) Field of Classification Search ...................... None
See application file for complete search history.

(56) References Cited

U.S. PATENT DOCUMENTS

| | | | |
|---|---|---|---|
| 6,827,190 B2 | 12/2004 | Hamasaki | |
| 2003/0230459 A1* | 12/2003 | Hamasaki | ................. 192/38 |
| 2004/0105168 A1* | 6/2004 | Hamasaki | ................. 359/696 |
| 2005/0072646 A1 | 4/2005 | Hamasaki et al. | |

OTHER PUBLICATIONS

U.S. Appl. No. 11/000,267, filed Dec. 1, 2004, Hamasaki et al.
U.S. Appl. No. 10/958,219, filed Oct. 5, 2004, Hamasaki et al.
U.S. Appl. No. 10/971,118, filed Oct. 25, 2004, Iikawa et al.

* cited by examiner

*Primary Examiner*—Richard M Lorence
(74) *Attorney, Agent, or Firm*—Greenblum & Bernstein, P.L.C.

(57) ABSTRACT

A one-way rotational transfer mechanism includes a rotary input shaft; a hollow-cylindrical rotary output shaft positioned around the rotary input shaft; a circumferentially-uneven-width-space forming portion formed on the rotary input shaft to form at least one accommodation space between the rotary input shaft and the cylindrical inner peripheral surface; a movable member; balls positioned between first and second holding surfaces; at least one roller member installed in the accommodation space; and a biasing device which biases the movable member so that the balls are sandwiched between the first and second holding surfaces and so that an normal surface and the roller member come into pressing contact with each other. The circumferentially-uneven-width-space forming portion is shaped so that a rotation of the rotary input shaft is transferred to the hollow-cylindrical rotary output shaft via the roller member when the rotary input shaft is rotated.

16 Claims, 15 Drawing Sheets

ONE-WAY ROTATIONAL TRANSFER MECHANISM

BACKGROUND OF THE INVENTION

1. Field of the Invention

The present invention relates to a one-way rotational transfer mechanism having a rotary input shaft and a rotary output shaft which are concentrically arranged, wherein rotation of the rotary input shaft is transferred to the rotary output shaft when the rotary input shaft is rotated by, e.g., motor, but rotation of the rotary output shaft is not transferred to the rotary input shaft when the rotary output shaft is rotated.

2. Description of the Related Art

Among conventional mechanisms having a rotary input shaft and a rotary output shaft, wherein rotation of the rotary input shaft is transferred to the rotary output shaft when the rotary input shaft is rotated by motor, a one-way rotational transfer mechanism which prevents the motor from being rotated by rotation of the rotary output shaft (i.e., prevents the rotary input shaft from being rotated by rotation of the rotary output shaft) when the rotary output shaft is rotated has been desired.

Note that the term "one-way rotational transfer" used in the present specification and claims means to allow rotation of the rotary input shaft to be transferred to the rotary output shaft while preventing rotation of the rotary output shaft from being transferred to the rotary input shaft.

SUMMARY OF THE INVENTION

The present invention provides a simple one-way rotational transfer mechanism which allows rotation of the rotary input shaft to be transferred to the rotary output shaft while preventing rotation of the rotary output shaft from being transferred to the rotary input shaft, wherein the resistance to the rotary input shaft can be reduced to as small a resistance as possible.

According to an aspect of the present invention, a one-way rotational transfer mechanism is provided, including a rotary input shaft having a normal surface and a first holding surface which respectively lie in two separate parallel planes normal to an axis of the rotary input shaft; a hollow-cylindrical rotary output shaft, having a cylindrical inner peripheral surface, positioned around the rotary input shaft to be freely rotatable relative to the rotary input shaft; a circumferentially-uneven-width-space forming portion formed on the rotary input shaft adjacent to the normal surface to form at least one accommodation space between the rotary input shaft and the cylindrical inner peripheral surface; a movable member, movable along the axis of the rotary input shaft, which is positioned so that the first holding surface is positioned between the movable member and the normal surface, the movable member having a second holding surface which faces the first holding surface, the second holding surface being normal to the axis; a plurality of balls positioned between the first holding surface and the second holding surface; at least one roller member installed in the accommodation space; and a biasing device which biases the movable member toward the first holding surface so that the balls are sandwiched between the first holding surface and the second holding surface and so that the normal surface and the roller member come into pressing contact with each other. The circumferentially-uneven-width-space forming portion is shaped so that a rotation of the rotary input shaft is transferred to the hollow-cylindrical rotary output shaft via the roller member to which the rotation is applied from the normal surface when the rotary input shaft is rotated.

The roller member can be a ball.

It is desirable for the roller member to include a ball, and a ring in which the ball is loosely fitted. An axial length of the ring is smaller than a diameter of the ball. The ring is positioned in associated the accommodation space so that an axis of the ring extends substantially parallel to each of the axis of the rotary input shaft and an axis of the hollow-cylindrical rotary output shaft.

It is desirable for the roller member to include a cylindrical column roller which is positioned in associated the accommodation space so that an axis of the cylindrical column roller extends substantially in a radial direction of the rotary input shaft.

It is desirable for the rotary input shaft to include an outer flange on which the normal surface is formed.

It is desirable for the circumferentially-uneven-width-space forming portion to include a portion having a non-circular cross section which includes at least one surface normal to a radial direction of the rotary input shaft.

It is desirable for the circumferentially-uneven-width-space forming portion having the non-circular cross section to be in the shape of a polygon.

It is desirable for the circumferentially-uneven-width-space forming portion to include at least one pair of inclined surfaces which are symmetrical with respect to a line extending in a radial direction of the rotary input shaft.

It is desirable for the circumferentially-uneven-width-space forming portion to include an eccentric cylindrical surface which is eccentric from the axis of the rotary input shaft.

In an embodiment, a one-way rotational transfer mechanism is provided, including a rotary input shaft having a normal surface and a first holding surface which respectively lie in two separate parallel planes normal to an axis of the rotary input shaft; a hollow-cylindrical rotary output shaft, having a cylindrical inner peripheral surface, positioned around the rotary input shaft to be freely rotatable relative to the rotary input shaft; a bearing for supporting the rotary input shaft and the hollow-cylindrical rotary output shaft to allow each of the rotary input shaft and the hollow-cylindrical rotary output shaft to be freely rotatable relative to the bearing; a second normal surface formed on the bearing, facing the normal surface to be parallel to the normal surface, and positioned so that the normal surface is positioned between the second normal surface and the first holding surface; a circumferentially-uneven-width-space forming portion formed between the normal surface and the second normal surface to form at least one accommodation space between the rotary input shaft and the cylindrical inner peripheral surface; a movable member, movable along the axis of the rotary input shaft, which is positioned so that the first holding surface is positioned between the movable member and the normal surface, the movable member having a second holding surface which faces the first holding surface, the second holding surface being normal to the axis; a plurality of balls positioned between the first holding surface and the second holding surface; at least one roller member installed in the accommodation space; and a biasing device which biases the movable member toward the first holding surface so that the balls are sandwiched between the first holding surface and the second holding surface and so that the roller member comes into pressing contact with the normal surface and the second normal surface. The circumferentially-uneven-width-space forming portion is shaped so that a rotation of the rotary input shaft is transferred to the hollow-cylindrical rotary output shaft via the roller member to which the rotation is applied from the normal surface when the rotary input shaft is rotated.

It is desirable for the rotary input shaft to include an outer flange, the normal surface and the first holding surface being formed on opposite sides of the outer flange.

In an embodiment, a one-way rotational transfer mechanism is provided, including a rotary input shaft having a normal surface lying in a plane normal to an axis of the rotary input shaft; a hollow-cylindrical rotary output shaft, having a cylindrical inner peripheral surface, positioned around the rotary input shaft to be freely rotatable relative to the rotary input shaft; a circumferentially-uneven-width-space forming portion formed on the rotary input shaft to be adjacent to the normal surface to form at least one accommodation space between the rotary input shaft and the cylindrical inner peripheral surface; at least one roller member installed in the accommodation space; and a magnetic biasing device which biases the rotary input shaft along the axis thereof by a magnetic force in a direction so that the normal surface and the roller member come into pressing contact with each other. The circumferentially-uneven-width-space forming portion is shaped so that a rotation of the rotary input shaft is transferred to the hollow-cylindrical rotary output shaft via the roller member to which the rotation is applied from the normal surface when the rotary input shaft is rotated.

It is desirable for the magnetic biasing device to include a first magnet installed at a fixed position; and a second magnet fixed relative to the rotary input shaft so that magnetic repulsion is produced between the first magnet and the second magnet.

It is desirable for at least one of the first magnet and the second magnet to be an electromagnet.

In an embodiment, a one-way rotational transfer mechanism is provided, including a rotary input shaft having a normal surface lying in a plane normal to an axis of the rotary input shaft; a hollow-cylindrical rotary output shaft, having a cylindrical inner peripheral surface, positioned around the rotary input shaft to be freely rotatable relative to the rotary input shaft; a bearing for supporting the rotary input shaft and the hollow-cylindrical rotary output shaft to allow each of the rotary input shaft and the hollow-cylindrical rotary output shaft to be freely rotatable relative to the bearing; a second normal surface formed on the bearing to lie in a plane normal to the axis of the rotary input shaft and to face the normal surface; a circumferentially-uneven-width-space forming portion formed on the rotary input shaft between the normal surface and the second normal surface to form at least one accommodation space between the rotary input shaft and the cylindrical inner peripheral surface; at least one roller member installed in the accommodation space; and a magnetic biasing device which biases the rotary input shaft along the axis thereof by a magnetic force in a direction to reduce a space between the normal surface and the second normal surface so that the roller member comes into pressing contact with the normal surface and the second normal surface. The circumferentially-uneven-width-space forming portion is shaped so that a rotation of the rotary input shaft is transferred to the hollow-cylindrical rotary output shaft via the roller member to which the rotation is applied from the normal surface when the rotary input shaft is rotated.

It is desirable for the magnetic biasing device to include a first magnet fixed relative to the bearing; and a second magnet fixed relative to the rotary input shaft so that magnetic repulsion is produced between the first magnet and the second magnet.

It is desirable for at least one of the first magnet and the second magnet to be an electromagnet.

It is desirable for the rotary input shaft to include an outer flange on which the normal surface is formed.

In an embodiment, a one-way rotational transfer mechanism is provided, including a rotary input shaft having an normal surface lying in a plane normal to an axis of the rotary input shaft; a hollow-cylindrical rotary output shaft, having a cylindrical inner peripheral surface, positioned around the rotary input shaft to be freely rotatable relative to the rotary input shaft; a circumferentially-uneven-width-space forming portion formed on the rotary input shaft to be adjacent to the normal surface to form at least one accommodation space between the rotary input shaft and the cylindrical inner peripheral surface; at least one roller member installed in the accommodation space; and a hydraulic biasing device which biases the rotary input shaft along the axis thereof by a hydraulic force in a direction so that the normal surface and the roller member come into pressing contact with each other. The circumferentially-uneven-width-space forming portion is shaped so that a rotation of the rotary input shaft is transferred to the hollow-cylindrical rotary output shaft via the roller member to which the rotation is applied from the normal surface when the rotary input shaft is rotated.

It is desirable for the hydraulic biasing device to produce the hydraulic force by supplying compressed air to the one-way rotational transfer mechanism.

It is desirable for the hydraulic biasing device to produce the hydraulic force by supplying pressurized oil to the one-way rotational transfer mechanism.

In an embodiment, a one-way rotational transfer mechanism is provided, including a rotary input shaft having a normal surface lying in a plane normal to an axis of the rotary input shaft; a hollow-cylindrical rotary output shaft, having a cylindrical inner peripheral surface, positioned around the rotary input shaft to be freely rotatable relative to the rotary input shaft; a bearing for supporting the rotary input shaft and the hollow-cylindrical rotary output shaft to allow each of the rotary input shaft and the hollow-cylindrical rotary output shaft to be freely rotatable relative to the bearing; a second normal surface formed on the bearing to lie in a plane normal to the axis of the rotary input shaft and to face the normal surface; a circumferentially-uneven-width-space forming portion formed on the rotary input shaft between the normal surface and the second normal surface to form at least one accommodation space between the rotary input shaft and the cylindrical inner peripheral surface; at least one roller member installed in the accommodation space; and a hydraulic biasing device which biases the rotary input shaft along the axis thereof by a hydraulic force in a direction to reduce a space between the normal surface and the second normal surface so that the roller member comes into pressing contact with the normal surface and the second normal surface. The circumferentially-uneven-width-space forming portion is shaped so that a rotation of the rotary input shaft is transferred to the hollow-cylindrical rotary output shaft via the roller member to which the rotation is applied from the normal surface when the rotary input shaft is rotated.

In an embodiment, a one-way rotational transfer mechanism is provided, including a rotary output shaft; a hollow-cylindrical rotary input shaft positioned around the rotary output shaft to be freely rotatable relative to the rotary output shaft about an axis thereof, the hollow-cylindrical rotary input shaft having a normal surface and a first holding surface which respectively lie in two separate parallel planes normal to an axis of the hollow-cylindrical rotary input shaft; a circumferentially-uneven-width-space forming portion formed on an inner peripheral surface of the hollow-cylindrical rotary input shaft to be adjacent to the normal surface to form at least one accommodation space between the hollow-cylindrical rotary input shaft and an outer peripheral surface of the rotary output shaft; a movable member, movable along the axis of the hollow-cylindrical rotary input shaft, which is positioned so that the first holding surface is positioned between the movable member and the normal surface, the movable member having a second holding surface which faces the first holding surface, the second holding surface being normal to the axis; a plurality of balls positioned between the first holding surface and the second holding surface; at least one roller member installed in the accommodation space; and a biasing device which biases the movable member toward the first holding surface so that the balls are sandwiched between the first holding surface and the second holding surface and so that the normal surface and the roller member come into pressing contact with each other. The circumferentially-uneven-width-space forming portion is shaped so that a rotation of the hollow-cylindrical rotary input shaft is transferred to the rotary output shaft via the roller member to which the rotation is applied from the normal surface when the hollow-cylindrical rotary input shaft is rotated.

The roller member can be a ball.

It is desirable for the roller member to include a ball, and a ring in which the ball is loosely fitted. An axial length of the ring is smaller than a diameter of the ball. The ring is positioned in associated the accommodation space so that an axis of the ring extends substantially parallel to each of the axis of the hollow-cylindrical rotary input shaft and the axis of the rotary output shaft.

It is desirable for the roller member to include a cylindrical column roller which is positioned in associated the accommodation space so that an axis of the cylindrical column roller extends substantially in a radial direction of the rotary output shaft.

It is desirable for the hollow-cylindrical rotary input shaft to include an inner flange on which the normal surface is formed.

It is desirable for the circumferentially-uneven-width-space forming portion to include a portion having a non-circular cross section which includes at least one surface normal to a radial direction of the hollow-cylindrical rotary input shaft.

It is desirable for the circumferentially-uneven-width-space forming portion having the non-circular cross section to be in the shape of a polygon.

It is desirable for the circumferentially-uneven-width-space forming portion to include at least one pair of inclined surfaces which are symmetrical with respect to a line extending in a radial direction of the hollow-cylindrical rotary input shaft.

It is desirable for the circumferentially-uneven-width-space forming portion to include an eccentric cylindrical surface which is eccentric from the axis of the hollow-cylindrical rotary input shaft.

In an embodiment, a one-way rotational transfer mechanism is provided, including a rotary output shaft; a hollow-cylindrical rotary input shaft positioned around the rotary output shaft to be freely rotatable relative to the rotary output shaft about an axis thereof, the hollow-cylindrical rotary input shaft having a normal surface and a first holding surface which respectively lie in two separate parallel planes normal to an axis of the hollow-cylindrical rotary input shaft; a bearing for supporting the hollow-cylindrical rotary input shaft and the rotary output shaft to allow each of the hollow-cylindrical rotary input shaft and the rotary output shaft to be freely rotatable relative to the bearing; a second normal surface formed on the bearing, facing the normal surface to be parallel to the normal surface, and positioned so that the normal surface is positioned between the second normal surface and the first holding surface; a circumferentially-uneven-width-space forming portion formed between the normal surface and the second normal surface to form at least one accommodation space between the hollow-cylindrical rotary input shaft and an outer peripheral surface of the rotary output shaft; a movable member, movable along the axis of the hollow-cylindrical rotary input shaft, which is positioned so that the first holding surface is positioned between the movable member and the normal surface, the movable member having a second holding surface which faces the first holding surface, the second holding surface being normal to the axis; a plurality of balls positioned between the first holding surface and the second holding surface; at least one roller member installed in the accommodation space; and a biasing device which biases the movable member toward the first holding surface so that the balls are sandwiched between the first holding surface and the second holding surface and so that the roller member comes into pressing contact with the normal surface and the second normal surface. The circumferentially-uneven-width-space forming portion is shaped so that a rotation of the hollow-cylindrical rotary input shaft is transferred to the rotary output shaft via the roller member to which the rotation is applied from the normal surface when the hollow-cylindrical rotary input shaft is rotated.

It is desirable for the hollow-cylindrical rotary input shaft to include an inner flange, the normal surface and the first holding surface being formed on opposite sides of the inner flange.

In an embodiment, a one-way rotational transfer mechanism is provided, including a rotary output shaft; a hollow-cylindrical rotary input shaft positioned around the rotary output shaft to be freely rotatable relative to the rotary output shaft about an axis thereof, the hollow-cylindrical rotary input shaft having a normal surface lying in a plane normal to an axis of the hollow-cylindrical rotary input shaft; a circumferentially-uneven-width-space forming portion formed on the hollow-cylindrical rotary input shaft to be adjacent to the normal surface to form at least one accommodation space between the hollow-cylindrical rotary input shaft and the cylindrical inner peripheral surface; at least one roller member installed in the accommodation space; and a magnetic biasing device which biases the hollow-cylindrical rotary input shaft along the axis thereof by a magnetic force in a direction so that the normal surface and the roller member come into pressing contact with each other. The circumferentially-uneven-width-space forming portion is shaped so that a rotation of the hollow-cylindrical rotary input shaft is transferred to the rotary output shaft via the roller member to which the rotation is applied from the normal surface when the hollow-cylindrical rotary input shaft is driven to rotate.

It is desirable for the magnetic biasing device to include a first magnet installed at a fixed position; and a second magnet fixed relative to the hollow-cylindrical rotary input shaft so that magnetic repulsion is produced between the first magnet and the second magnet.

It is desirable for at least one of the first magnet and the second magnet to be an electromagnet.

In an embodiment, a one-way rotational transfer mechanism is provided, including a rotary output shaft; a hollow-cylindrical rotary input shaft positioned around the rotary output shaft to be freely rotatable relative to the rotary output shaft about an axis thereof, the hollow-cylindrical rotary input shaft having a normal surface lying in a plane normal to an axis of the hollow-cylindrical rotary input shaft; a bearing for supporting the hollow-cylindrical rotary input shaft and the rotary output shaft to allow each of the hollow-cylindrical rotary input shaft and the rotary output shaft to be freely rotatable relative to the bearing; a second normal surface formed on the bearing to lie in a plane normal to the axis of the hollow-cylindrical rotary input shaft and to face the normal surface; a circumferentially-uneven-width-space forming portion formed on the hollow-cylindrical rotary input shaft between the normal surface and the second normal surface to form at least one accommodation space between the hollow-cylindrical rotary input shaft and the cylindrical inner peripheral surface; at least one roller member installed in the accommodation space; and a magnetic biasing device which biases the hollow-cylindrical rotary input shaft along the axis thereof by a magnetic force in a direction to reduce a space between the normal surface and the second normal surface so that the roller member comes into pressing contact with the normal surface and the second normal surface. The circumferentially-uneven-width-space forming portion is shaped so that a rotation of the hollow-cylindrical rotary input shaft is transferred to the rotary output shaft via the roller member to which the rotation is applied from the normal surface when the hollow-cylindrical rotary input shaft is driven to rotate.

It is desirable for the magnetic biasing device to include a first magnet fixed relative to the bearing; and a second magnet fixed relative to the hollow-cylindrical rotary input shaft so that magnetic repulsion is produced between the first magnet and the second magnet.

It is desirable for at least one of the first magnet and the second magnet to be an electromagnet.

It is desirable for the hollow-cylindrical rotary input shaft to include an inner flange on which the normal surface is formed.

In an embodiment, a one-way rotational transfer mechanism is provided, including a rotary output shaft; a hollow-cylindrical rotary input shaft positioned around the rotary output shaft to be freely rotatable relative to the rotary output shaft about an axis thereof, the hollow-cylindrical rotary input shaft having a normal surface lying in a plane normal to an axis of the hollow-cylindrical rotary input shaft; a circumferentially-uneven-width-space forming portion formed on the hollow-cylindrical rotary input shaft to be adjacent to the normal surface to form at least one accommodation space between the hollow-cylindrical rotary input shaft and the cylindrical inner peripheral surface; at least one roller member installed in the accommodation space; and a hydraulic biasing device which biases the hollow-cylindrical rotary input shaft along the axis thereof by a hydraulic force in a direction so that the normal surface and the roller member come into pressing contact with each other. The circumferentially-uneven-width-space forming portion is shaped so that a rotation of the hollow-cylindrical rotary input shaft is transferred to the rotary output shaft via the roller member to which the rotation is applied from the normal surface when the hollow-cylindrical rotary input shaft is rotated.

It is desirable for the hydraulic biasing device to produce the hydraulic force by supplying compressed air to the one-way rotational transfer mechanism.

It is desirable for the hydraulic biasing device to produce the hydraulic force by supplying pressurized oil to the one-way rotational transfer mechanism.

In an embodiment, a one-way rotational transfer mechanism is provided, including a rotary output shaft; a hollow-cylindrical rotary input shaft positioned around the rotary output shaft to be freely rotatable relative to the rotary output shaft about an axis thereof, the hollow-cylindrical rotary input shaft having a normal surface lying in a plane normal to an axis of the hollow-cylindrical rotary input shaft; a bearing for supporting the hollow-cylindrical rotary input shaft and the rotary output shaft to allow each of the hollow-cylindrical rotary input shaft and the rotary output shaft to be freely rotatable relative to the bearing; a second normal surface formed on the bearing to lie in a plane first holding surface the axis of the hollow-cylindrical rotary input shaft and to face the normal surface; a circumferentially-uneven-width-space forming portion formed on the hollow-cylindrical rotary input shaft between the normal surface and the second normal surface to form at least one accommodation space between the hollow-cylindrical rotary input shaft and an outer peripheral surface of the cylindrical inner peripheral surface; at least one roller member installed in the accommodation space; and a hydraulic biasing device which biases the hollow-cylindrical rotary input shaft along the axis thereof by a hydraulic force in a direction to reduce a space between the normal surface and the second normal surface so that the roller member comes into pressing contact with the normal surface and the second normal surface. The circumferentially-uneven-width-space forming portion is shaped so that a rotation of the hollow-cylindrical rotary input shaft is transferred to the rotary output shaft via the roller member to which the rotation is applied from the normal surface when the hollow-cylindrical rotary input shaft is driven to rotate.

According to the present invention, a simple one-way rotational transfer mechanism is achieved, which allows rotation of the rotary input shaft to be transferred to the rotary output shaft while preventing rotation of the rotary output shaft from being transferred to the rotary input shaft, wherein the rotational resistance of the rotary input shaft can be reduced to a minimum.

The present disclosure relates to subject matter contained in Japanese Patent Application No. 2004-046641 (filed on Feb. 23, 2004) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
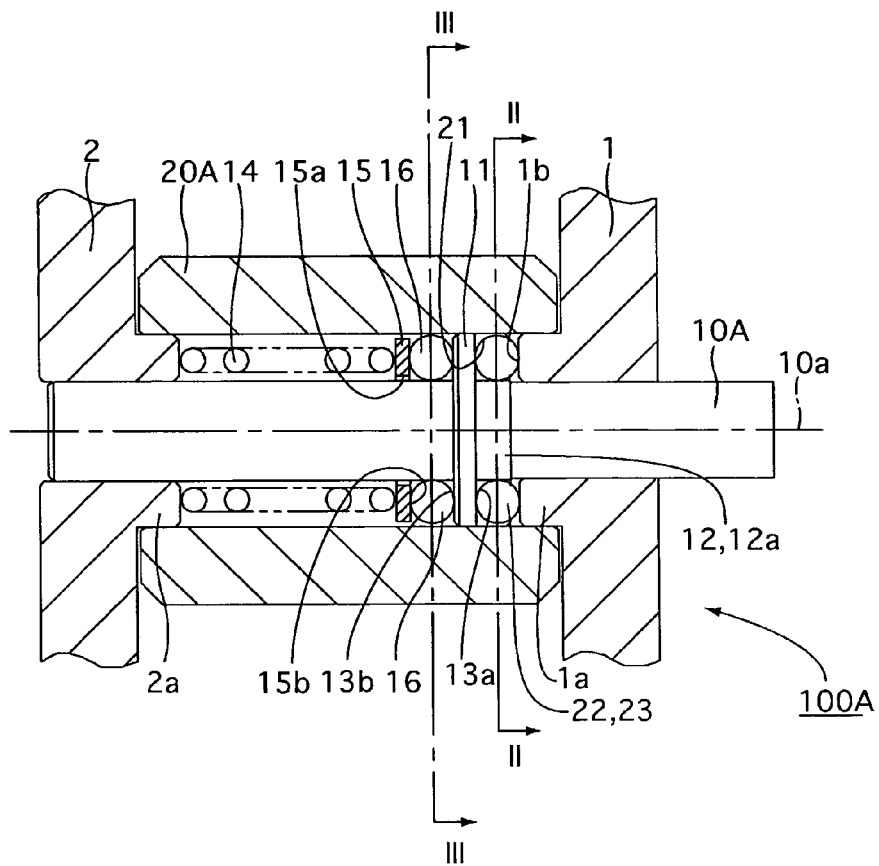
FIG. 1 is a longitudinal cross sectional view of a first embodiment of a one-way rotational transfer mechanism according to the present invention.
Figure 3:
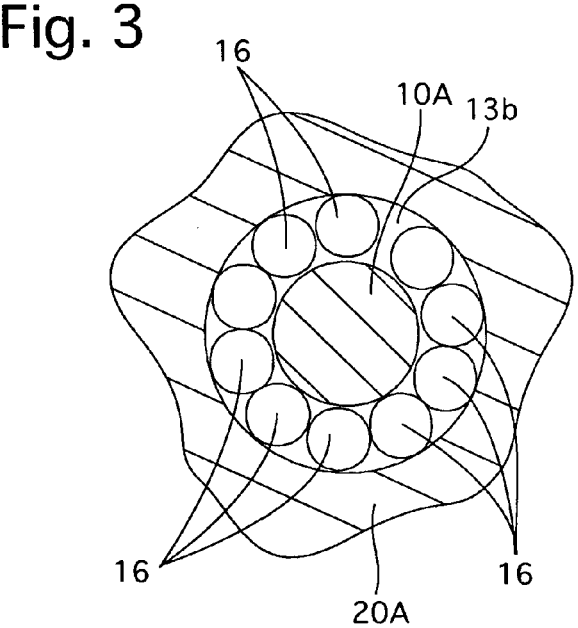
FIG. 3 is a cross sectional view taken along III-III line shown in FIG. 1.
Figure 2:
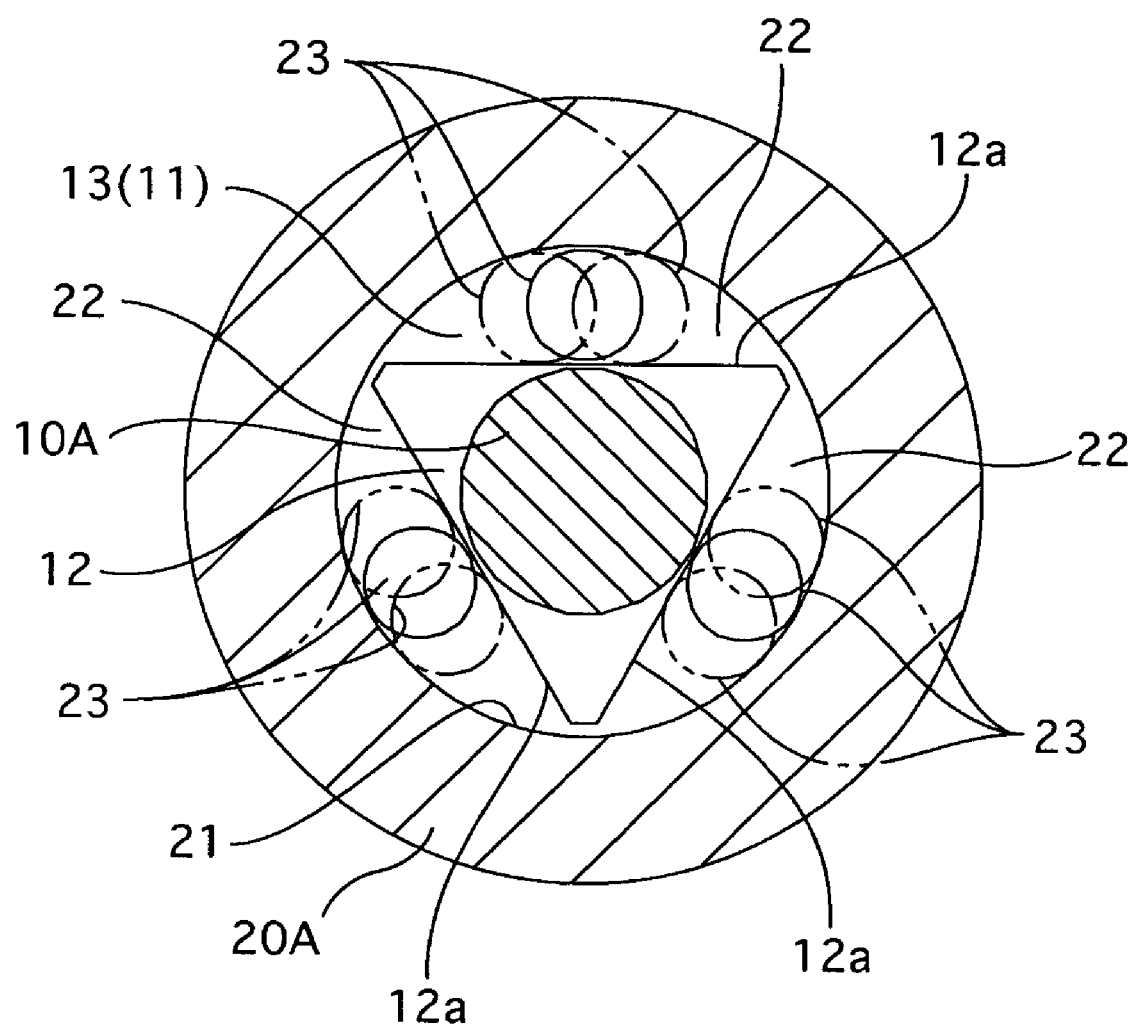
FIG. 2 is a cross sectional view taken along II-II line shown in FIG. 1, showing an embodiment of a circumferentially-uneven-width-space forming portion (a portion having a non-circular cross section) of the one-way rotational transfer mechanism shown in FIG. 1.

FIGS. 1 through 4 show a first embodiment of a one-way rotational transfer mechanism according to the present invention. The one-way rotational transfer mechanism 100A is provided with two parallel bearing plates: a first bearing plate 1 and a second bearing plate 2, which have bosses (bearings) 1a and 2a, respectively. Central holes of the bosses 1a and 2a are aligned on a common axis. The one-way rotational transfer mechanism 100A is provided with a rotary input shaft 10A which is fitted in the central holes of the bosses 1a and 2a so that the rotary input shaft 10A is freely rotatable about an axis 10a of the bosses 1a and 2a. The rotary input shaft 10A is driven by, e.g., a motor (not shown). The rotary input shaft 10A is provided between the opposite ends thereof, between the bosses 1a and 2a, with an outer flange 11. The rotary input shaft 10A is provided, adjacent to the outer flange 11 between the outer flange 11 and the boss 1a, with a triangular prism portion 12, the axial center of which is coaxial to an axis 10a of the rotary input shaft 10A. The triangular prism portion 12 has an even thickness in the axial direction (horizontal direction as viewed in FIG. 1) of the rotary input shaft 10A. The triangular prism portion 12 serves as a circumferentially-uneven-width-space forming portion (a portion having a non-circular cross section). The triangular prism portion 12 has a substantially regular triangular shape, the center of which is coincident with the axis 10a of the rotary input shaft 10A as viewed from one end (the left end as viewed in FIG. 1) of the rotary input shaft 1A along the axis 10a thereof. The outer peripheral surface of the triangular prism portion 12 is provided with three contact surfaces 12a arranged at regular intervals of 120 degrees about the axis 10a of the rotary input shaft 10A. Each contact surface 12a is a flat surface, and extends orthogonally to a radial direction of the rotary input shaft 10. The outer flange 11 is provided on one side (right side as viewed in FIG. 1) thereof adjacent to the triangular prism portion 12 with an orthogonal surface (normal surface) 13a which lies in a plane normal to the axis 10a of the rotary input shaft 10A, and is further provided on the other side (left side as viewed in FIG. 1) thereof with another orthogonal surface (first holding surface) 13b which lies in a plane normal to the axis 10a of the rotary input shaft 10A. The boss 1a is provided, on one end (left end as viewed in FIG. 1) thereof facing the orthogonal surface 13a, with an orthogonal end surface (second normal surface) 1b which lies in a plane normal to the axis 10a of the rotary input shaft 10A. Namely, the orthogonal surface 13a and the orthogonal end surface 1b extend parallel to each other.

The one-way rotational transfer mechanism 100A is provided, on outer peripheral surfaces of the bosses 1a and 2a between the first and the second bearing plates 1 and 2, with a hollow-cylindrical rotary output shaft 20A which is freely rotatable about the axis 10a of the rotary input shaft 10A. The hollow-cylindrical rotary output shaft 20A is coaxial with the axis 10a of the rotary input shaft 10A. The hollow-cylindrical rotary output shaft 20A has a simple hollow cylindrical shape, and has a cylindrical inner peripheral surface (cylindrical surface) 21 which is provided coaxially with the axis 10a of the rotary input shaft 10A. A space between the orthogonal surface 13a of the outer flange 11 and the orthogonal end surface 1b of the boss 1a around the triangular prism portion 12 is surrounded by a portion of the cylindrical inner peripheral surface 21 of the hollow-cylindrical rotary output shaft 20A to form three accommodation spaces (roller member accommodation spaces) 22 each serving as a circumferentially-uneven-width-space. In the present embodiment shown in FIGS. 1 through 4, the number of accommodation spaces 22 formed by the circumferentially-uneven-width-space forming portion is three, and a steel ball (roller member) 23 is installed in each of the three accommodation spaces 22 because the triangular prism portion 12 serves as the circumferentially-uneven-width-space forming portion. The steel balls 23 have a diameter smaller than the maximum width of each accommodation space 22 in a radial direction of the rotary input shaft 10A so that each steel ball 23 can move in the associated accommodation space 22. Each steel ball 23 is a precision engineered hard steel ball. Hardened steel balls of a conventional ball bearing can be used as the steel balls 23.

The one-way rotational transfer mechanism 100A is provided around the rotary input shaft 10A between the outer flange 11 and the boss 2a with an annular member (ring member) 15 having a central hole 15a greater in diameter than the rotary input shaft 10A. The annular member 15 is loosely fitted around the rotary input shaft 10A to be movable along an axis 10a of the rotary input shaft 10A relative to the rotary input shaft 10A and rotatable about the axis 10a relative to the rotary input shaft 10A. A surface of the annular member 15 which is adjacent to the outer flange 11 is formed as an orthogonal surface (second holding surface) 15b which is parallel to the first holding surface 13b of the outer flange 11. The one-way rotational transfer mechanism 100A is provided in an annular space between the first holding surface 13b and the second holding surface 15b with a plurality of balls (e.g., steel balls of a conventional ball bearing which are similar to the steel balls 23) 16. Each ball 16 can freely rotate about its axis in the annular space and revolve around the rotary input shaft 10A.

The one-way rotational transfer mechanism 100A is provided, around the rotary input shaft 10A between the annular member 15 and the boss 2a, with a compression coil spring (biasing device) 14. The compression coil spring 14 biases the annular member 15 toward the outer flange 11 so that the plurality of balls 16 are sandwiched between the first holding surface 13b and the second holding surface 15b and so that the three steel balls 23 are pressed against both the orthogonal surface 13a and the orthogonal end surface 1b by the spring force of the compression coil spring 14 which is transferred to the outer flange 11 via the plurality of balls 16.

Operations of the one-way rotational transfer mechanism 100A having the above described simple structure will be discussed hereinafter. An important point in the structure of the one-way rotational transfer mechanism 100A is that each ball 16 is sandwiched between the annular member 15 and the outer flange 11 to be pressed against the second holding surface 15b and the first holding surface 13b by the spring force of the compression coil spring 14, and that the orthogonal surface 13a of the outer flange 11 and each steel ball 23 are in intimate contact with each other by the spring force of the compression coil spring 14; namely, each steel ball 23 is continuously sandwiched between the orthogonal surface 13a of the outer flange 11 and the orthogonal end surface 1b of the boss 1a. If the rotary input shaft 10A is driven to rotate, the outer flange 11 rotates together with the rotary input shaft 10A, and this rotation of the outer flange 11 rotates each steel ball 23 that is in frictional contact with the orthogonal surface 13a. Accordingly, each steel ball 23 moves from a neutral position thereof (indicated by a solid line in FIG. 2), in a rotational direction opposite to the rotational direction of the rotary input shaft 10A with respect to the orthogonal surface 13a, to move into one of wedge-shaped opposite ends which are formed in the associated accommodation space 22 between the associated contact surface 12a of the triangular prism portion 12 and the cylindrical inner peripheral surface 21 of the hollow-cylindrical rotary output shaft 20A. As a result, each steel ball 23 comes into firm contact with the cylindrical inner peripheral surface 21 to thereby transfer rotation of the rotary input shaft 10A to the hollow-cylindrical rotary output shaft 20A via the steel balls 23 and the cylindrical inner peripheral surface 21 of the hollow-cylindrical rotary output shaft 20A. This action occurs regardless of the rotational direction of the rotary input shaft 10A. Namely, rotation of the rotary input shaft 10A in either rotational direction can be transferred to the hollow-cylindrical rotary output shaft 20A.

The frictional resistance between the balls 16 and the first holding surface 13b of the outer flange 11 is extremely small as compared with that in the case using neither the annular member 15 nor the balls 16 (the case where the compression coil spring 14 is brought into contact directly with the first holding surface 13b). Accordingly, the resistance to the rotary input shaft 10A during rotation thereof is extremely small, which-allows an extremely smooth rotation of the rotary input shaft 10A.

On the other hand, if the hollow-cylindrical rotary output shaft 20A is driven to rotate, each steel ball 23 merely rotates in the associated accommodation space 22 because the steel ball 23 is merely in point contact with the cylindrical inner peripheral surface 21 of the hollow-cylindrical rotary output shaft 20A even if the steel ball 23 is in contact with the cylindrical inner peripheral surface 21. Therefore, no rotation of the hollow-cylindrical rotary output shaft 20A is transferred to the rotary input shaft 10A even if a rotation is applied to the hollow-cylindrical rotary output shaft 20A. Namely, when the rotary input shaft 10A is driven to rotate, each steel ball 23 is engaged with one of the wedge-shaped opposite ends that are formed between the associated contact surface 12a and the cylindrical inner peripheral surface 21 because the rotation of the rotary input shaft 10A is transferred to each steel ball 23 via the orthogonal surface 13a; consequently, the rotation of the rotary input shaft 10A is transferred to the hollow-cylindrical rotary output shaft 20A. However, when the hollow-cylindrical rotary output shaft 20A is driven to rotate, very little force or substantially no force is generated, i.e., sufficient force for causing each steel ball 23 to be engaged with one of the wedge-shaped opposite ends is not generated, because the rotation of the hollow-cylindrical rotary output shaft 20A is transferred to each steel ball 23 via the cylindrical inner peripheral surface 21. As a consequence, the rotation of the hollow-cylindrical rotary output shaft 20A is not transferred to the rotary input shaft 10A.

Figure 5:
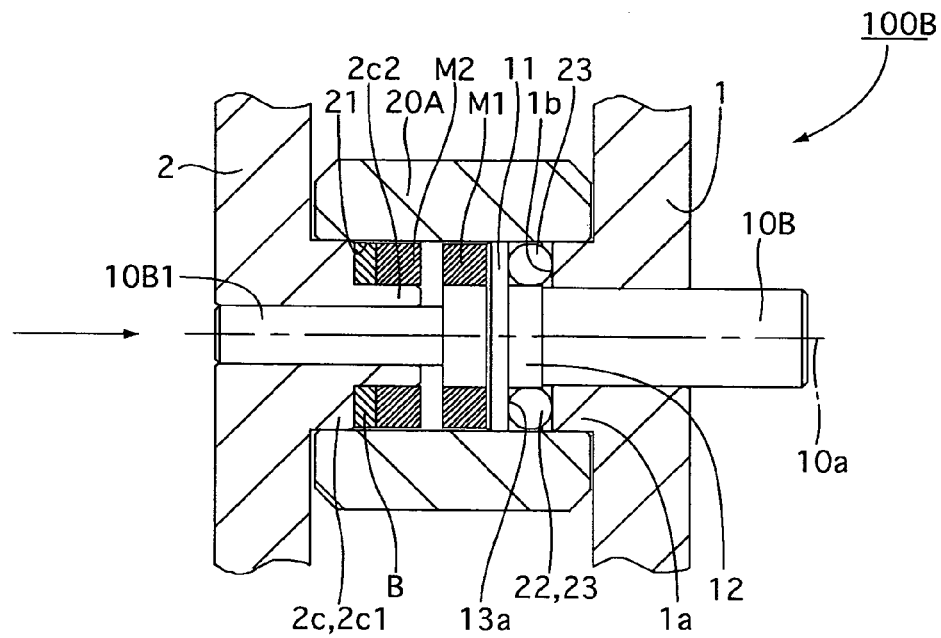
FIG. 5 is a longitudinal cross sectional view of a second embodiment of the one-way rotational transfer mechanism according to the present invention.

FIG. 5 shows a second embodiment of the one-way rotational transfer mechanism according to the present invention.

The second embodiment of the one-way rotational transfer mechanism 100B is substantially the same as the above described first embodiment of the one-way rotational transfer mechanism 100A except that the rotary input shaft (10B) of the one-way rotational transfer mechanism 100B is different in structure from the rotary input shaft (10A) of the one-way rotational transfer mechanism 100A, the biasing device (M1 and M2) of the one-way rotational transfer mechanism 100B is different in structure from the biasing device (14) of the one-way rotational transfer mechanism 10A, and the boss (2c) of the second bearing plate 2 of the one-way rotational transfer mechanism 100B is different in structure from the boss (2b) of the second bearing plate 2 of the one-way rotational transfer mechanism 100A.

Figure 4:
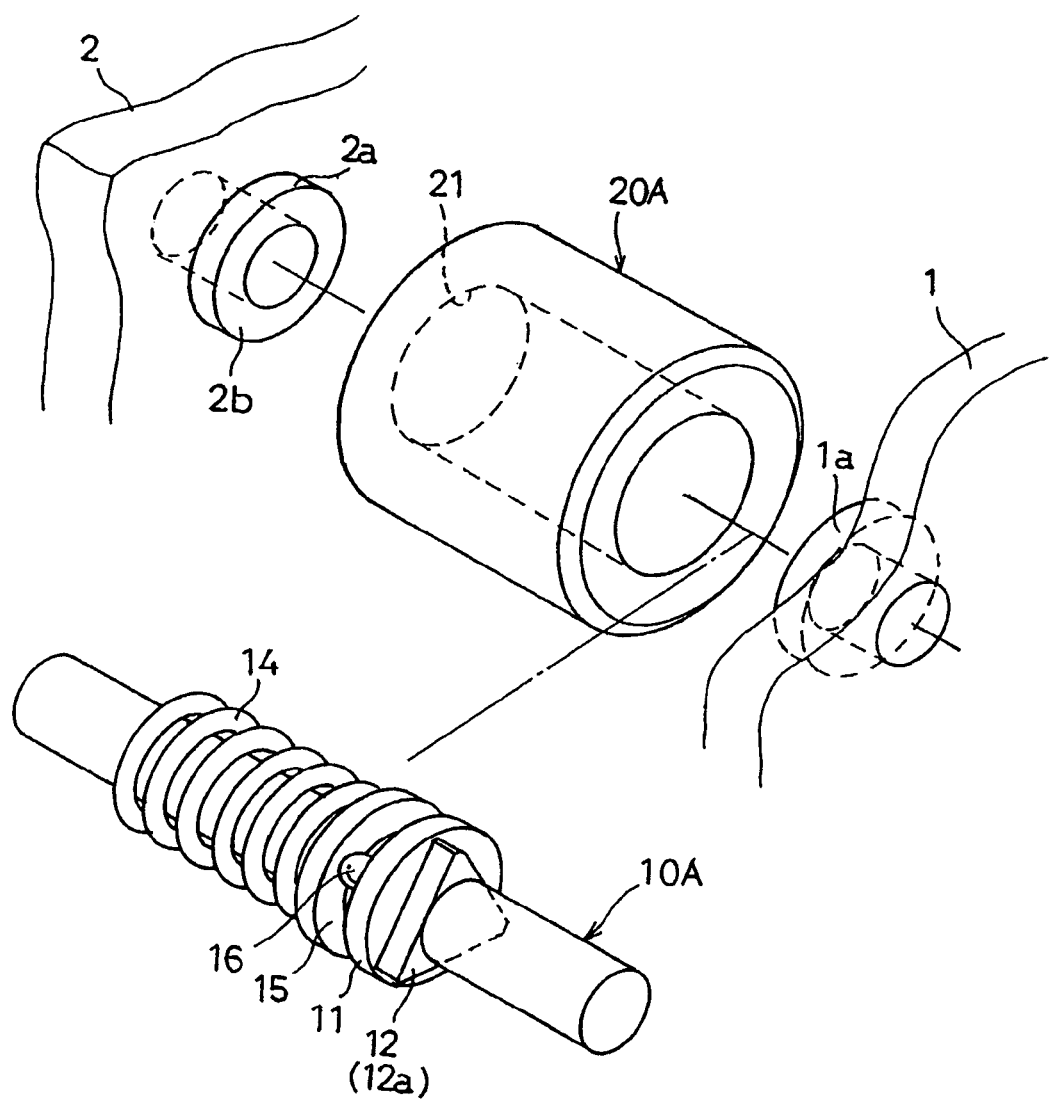
FIG. 4 is an exploded perspective view, partly cutaway, of the one-way rotational transfer mechanism shown in FIG. 1.

In the second embodiment of the one-way rotational transfer mechanism 100B, the second bearing plate 2 is provided with a boss 2c which corresponds to the boss 2b shown in FIGS. 1 and 4 but is slightly different in structure from the boss 2b. A portion of the rotary input shaft 10B which is fitted in the central hole of the boss 2c is formed as a small-diameter portion 10B1, the diameter of which is smaller than that of the remaining portion of the rotary input shaft 10B. The one-way rotational transfer mechanism 100B is provided on the rotary input shaft 10B between the boss 2c and the outer flange 11 with a ring-shaped first permanent magnet (first magnet) M1. The first permanent magnet M1 is firmly fitted on the one-way rotational transfer mechanism 100B, and contacts an end surface (left surface as viewed in FIG. 5) of the outer flange 11 which lies in a plane normal to the axis 10a of the rotary input shaft 10A.

The boss 2c is formed so that the diameter thereof changes stepwise; i.e., the boss 2c is provided with a large-diameter portion 2c1 and a small-diameter portion 2c2 which projects in a direction away from the second bearing plate 2 (rightward as viewed in FIG. 5) from the large-diameter portion 2c1. The opposite ends of the hollow-cylindrical rotary output shaft 20A are fitted on the bosses 1a and 2c to be rotatably supported by the bosses 1a and 2c, respectively. A spacer B, having an annular shape, is fitted on the small-diameter portion 2c2, and is fixed to an annular end surface of the large-diameter portion 2c1. A ring-shaped second permanent magnet (second magnet) M2 is fitted on the small-diameter portion 2c2, and is fixed to an end surface (right surface as viewed in FIG. 5) of the spacer B. The outer diameters of the first permanent magnet M1 and the second permanent magnet M2 are substantially the same and are slightly smaller than the inner diameter of the hollow-cylindrical rotary output shaft 20A, so that neither the first permanent magnet M1 nor the second permanent magnet M2 interferes with the inner peripheral surface 21 of the hollow-cylindrical rotary output shaft 20A. The centers of the first and second permanent magnets M1 and M2 are coaxial with the axis 10a.

Figure 6:
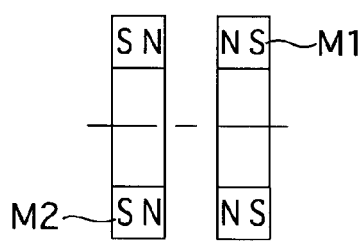
FIG. 6 is a longitudinal cross sectional view of an embodiment of ring-shaped permanent magnets which serve as a magnetic biasing device.
Figure 7:
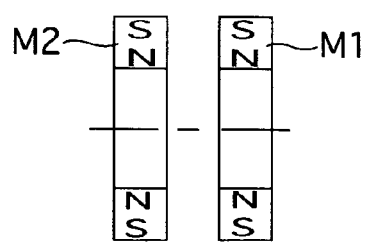
FIG. 7 is a longitudinal cross sectional view of another embodiment of the ring-shaped permanent magnets which serve as a magnetic biasing device.

The first permanent magnet M1 and the second permanent magnet M2 are elements of a magnetic biasing device, and continuously repel each other by virtue of their magnetic interactions. As shown in FIG. 6, the first and second permanent magnets M1 and M2 are magnetized and arranged so that each of the axially opposed (adjacent) surfaces of the first and second permanent magnets M1 and M2 is magnetized north and so that each of the respective axially-opposite surfaces of the first and second permanent magnets M1 and M2 is magnetized south. The same effect can be attained if the axially opposed (adjacent) surfaces of the first and second permanent magnets M1 and M2 are magnetized south and the respective axially-opposite surfaces thereof are magnetized north. Conversely, the first and second permanent magnets M1 and M2 can be magnetized and arranged so that each of radially inner portions of the first and second permanent magnets M1 and M2 is magnetized north and so that each of radially outer portions of the first and second permanent magnets M1 and M2 is magnetized south, as shown in FIG. 7, to obtain the same effect. Furthermore, the same effect can be attained if the radially inner portion of the first and second permanent magnets M1 and M2 are magnetized south and the radially outer portions thereof are magnetized north.

In the above illustrated embodiment of the one-way rotational transfer mechanism 100B, the orthogonal surface 13a of the outer flange 11 and each steel ball 23 are in intimate contact with each other (each ball 23 is sandwiched between the orthogonal surface 13a and the orthogonal end surface 1b of the boss 1a) due to the magnetic repulsion produced by the first permanent magnet M1 and the second permanent magnet M2 therebetween continuously biasing the outer flange 11 (the rotary input shaft 10B) toward the boss 1a of the first bearing plate 1. Therefore, similar to the first embodiment of the one-way rotational transfer mechanism, the hollow-cylindrical rotary output shaft 20A rotates if the rotary input shaft 10B is rotated, but the rotary input shaft 10B does not rotate if the hollow-cylindrical rotary output shaft 20A is rotated because this rotation of the hollow-cylindrical rotary output shaft 20A is not transferred to the rotary input shaft 10B.

Additionally, in the one-way rotational transfer mechanism 100B, no friction is produced between the outer flange 11 (the rotary input shaft 10B) and the first and second permanent magnets M1 and M2 during rotation of the rotary input shaft 10B because the first and second permanent magnets M1 and M2 which are elements of the magnetic biasing device are not in contact with each other. Accordingly, the rotary input shaft 10B in the second embodiment of the one-way rotational transfer mechanism 100B can rotate more smoothly than the rotary input shaft 10A in the first embodiment of the one-way rotational transfer mechanism 10A.

Moreover, if the spacer B is replaced by another spacer (not shown) having a different thickness (in the axial direction of the 10B), and the distance between the first and second permanent magnets M1 and M2 is altered, the repulsion between the first and second permanent magnets M1 and M2 changes, so that the frictional force between the steel balls 23 and the orthogonal surface 13a changes. Accordingly, by altering the thickness of the spacer B, transmission efficiency (hollow-cylindrical rotary output shaft 20A rotational force/rotary input shaft 10B rotational force) of the rotational force from the rotary input shaft 10B to the hollow-cylindrical rotary output shaft 20A is adjustable.

Figure 8:
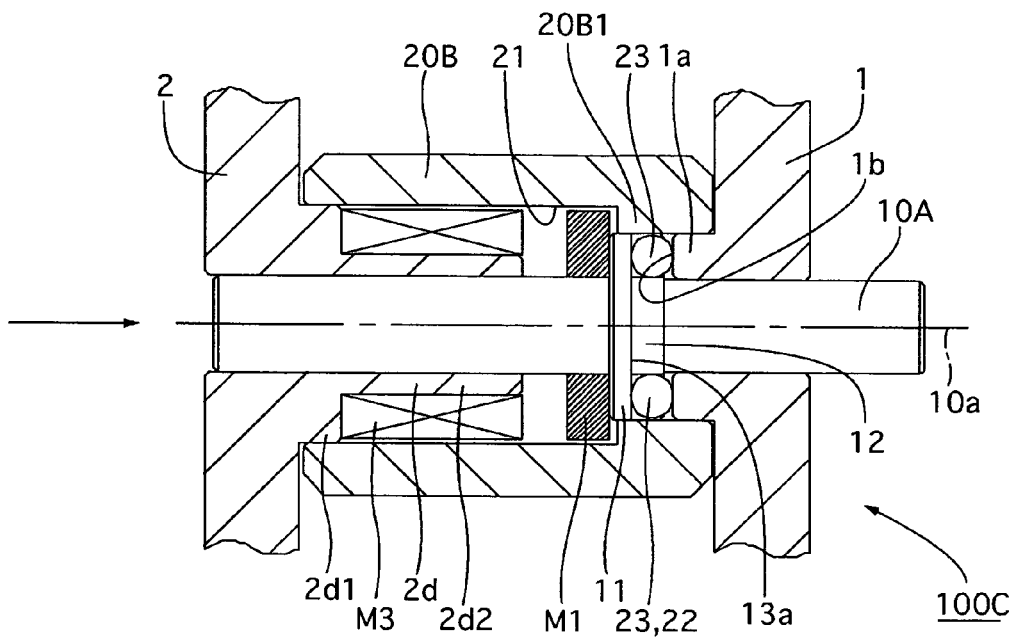
FIG. 8 is a longitudinal cross sectional view of a third embodiment of the one-way rotational transfer mechanism according to the present invention.

FIG. 8 shows a third embodiment of the one-way rotational transfer mechanism according to the present invention. This embodiment of the one-way rotational transfer mechanism 100C is substantially the same as the above described first embodiment of the one-way rotational transfer mechanism 100A except that the boss (2d) of the second bearing plate 2 of the one-way rotational transfer mechanism 100C is different in structure from the boss (2b) of the second bearing plate 2 of the one-way rotational transfer mechanism 100A, the hollow-cylindrical rotary output shaft (20B) of the one-way rotational transfer mechanism 100C is different in structure from the hollow-cylindrical rotary output shaft (20A) of the one-way rotational transfer mechanism 100A, and the biasing device (M1 and M3) of the one-way rotational transfer mechanism 100C is different in structure from the biasing device (14) of the one-way rotational transfer mechanism 100A.

Similar to the boss 2c in the second embodiment of the one-way rotational transfer mechanism 100B, the boss 2d is formed so that the diameter thereof changes stepwise; i.e., the boss 2d is provided with a large-diameter portion 2d1 and a small-diameter portion 2d2, which projects in a direction away from the second bearing plate 2 (rightward as viewed in FIG. 8) from the large-diameter portion 2d1.

The hollow-cylindrical rotary output shaft 20B is provided, on a portion of the cylindrical inner peripheral surface 21 thereof adjacent to the first bearing plate 1, with an annular projection 20B1 which projects radially inwards so that an inner peripheral surface of the annular projection 20B1 is rotatably fitted on the outer peripheral surfaces of the boss 1a and the outer flange 11. On the other hand, a portion of the cylindrical inner peripheral surface 21 adjacent to the second bearing plate 2 is rotatably fitted on the large-diameter portion 2d1 of the boss 2d.

The one-way rotational transfer mechanism 100C is provided around the small-diameter portion 2d2 with a cylindrical electromagnet (second magnet) M3 which is electrically connected to a power source (not shown). Coil electric wire wound around the small-diameter portion 2d2 constitutes the electromagnet M3.

The permanent magnet (first magnet) M1 and the electromagnet (second magnet) M3 are elements of a magnetic biasing device, and repel each other by virtue of their magnetic interactions. A current is continuously passed through the electromagnet M3 during operation of the one-way rotational transfer mechanism 100C in a predetermined direction of current flow so that magnetic repulsion is produced between the permanent magnet M1 and the electromagnet M3.

In the above described simple structure of the one-way rotational transfer mechanism 100C, the orthogonal surface 13a of the outer flange 11 and each steel ball 23 are in intimate contact with each other (each ball 23 is sandwiched between the orthogonal surface 13a and the orthogonal end surface 1b of the boss 1a) due to the magnetic repulsion produced by the permanent magnet M1 and the electromagnet M3 therebetween continuously biasing the outer flange 11 (the rotary input shaft 10A) toward the boss 1a of the first bearing plate 1. Therefore, similar to the first embodiment of the one-way rotational transfer mechanism, the hollow-cylindrical rotary output shaft 20B rotates if the rotary input shaft 10A is rotated, but the rotary input shaft 10A does not rotate if the hollow-cylindrical rotary output shaft 20B is rotated because this rotation of the hollow-cylindrical rotary output shaft 20B is not transferred to the rotary input shaft 10A.

Additionally, in the one-way rotational transfer mechanism 100C, no friction is produced between the outer flange 11 (the rotary input shaft 10A) and each of the first permanent magnet M1 and the electromagnetic magnet M3 during rotation of the rotary input shaft 10A because the first permanent magnet M1 and the electromagnetic magnet M3, which are elements of the magnetic biasing device, are not in contact with each other, similar to the second embodiment of the one-way rotational transfer mechanism 100B. Accordingly, the rotary input shaft 10A in the third embodiment of the one-way rotational transfer mechanism 100C can rotate more smoothly than the rotary input shaft 10A in the first embodiment of the one-way rotational transfer mechanism 100A.

In addition, it is possible to change the magnetic force of the electromagnet M3 to thereby change the magnetic repulsion produced between the permanent magnet M1 and the electromagnet M3 by changing the magnitude of the current flow through the coil electric wire of the electromagnet M3.

Although the first magnet and the second magnet (the right-side magnet and the left-side magnet as viewed in FIG. 8) are provided as a permanent magnet (M1) and an electromagnet (M3), respectively, in the above illustrated third embodiment of the one-way rotational transfer mechanism, the first magnet and the second magnet can be provided as an electromagnet and a permanent magnet, respectively, or each of the first magnet and the second magnet can be provided as an electromagnet.

Figure 9:
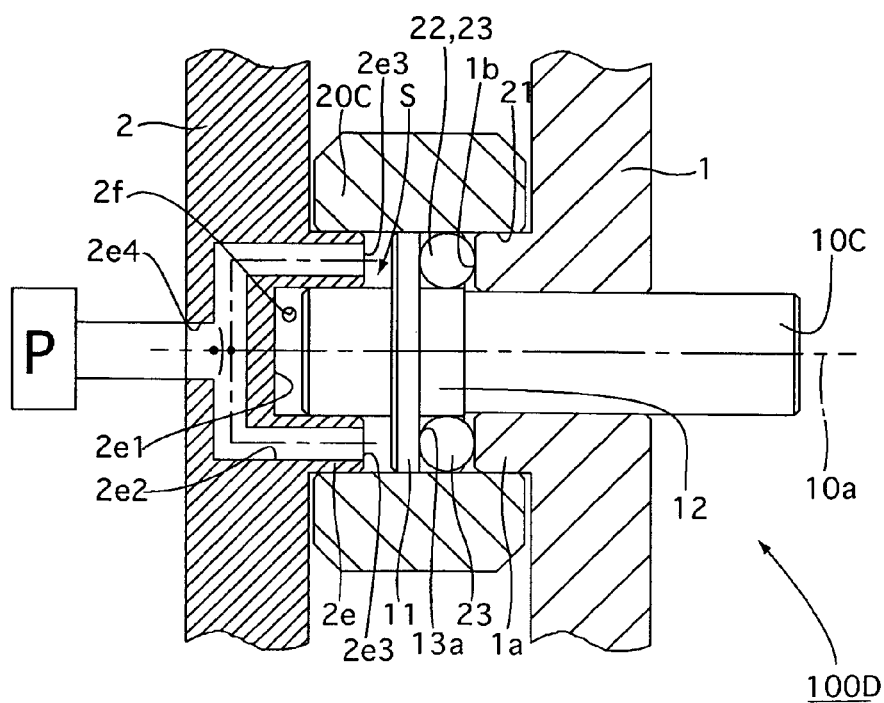
FIG. 9 is a longitudinal cross sectional view of a fourth embodiment of the one-way rotational transfer mechanism according to the present invention.

FIG. 9 is a fourth embodiment of the one-way rotational transfer mechanism according to the present invention. This embodiment of the one-way rotational transfer mechanism 100D is substantially the same as the above described first embodiment of the one-way rotational transfer mechanism 100A except that the rotary input shaft (10C) of the one-way rotational transfer mechanism 100D is different in structure from the rotary input shaft (10A) of the one-way rotational transfer mechanism 100A, the hollow-cylindrical rotary output shaft (20C) of the one-way rotational transfer mechanism 100D is different in structure from the hollow-cylindrical cylicdrical rotary output shaft (20A) of the one-way rotational transfer mechanism 100A, the biasing device (S, P, 2e4 and 2e2) of the one-way rotational transfer mechanism 100D is different in structure from the biasing device (14) of the one-way rotational transfer mechanism 10A, and the boss (2e) of the second bearing plate 2 of the one-way rotational transfer mechanism 100D is different in structure from the boss (2b) of the second bearing plate 2 of the one-way rotational transfer mechanism 10A.

The length of the rotary input shaft 10C of the one-way rotational transfer mechanism 100D is smaller than the length of the rotary input shaft 10A of the first embodiment of the one-way rotational transfer mechanism 100A.

The central hole of the boss 2e of the second bearing plate 2 is formed as a bottomed central hole 2e1 in which the left end of the rotary input shaft 10C is fitted into the bottomed central hole 2e1 in a watertight fashion to be rotatable on the axis 10a and movable along the axis 10a relative to the second bearing plate 2. Furthermore, an outlet hole 2f which provides a passage between the bottomed central hole 2e1 and the outside of the second bearing plate 2 is provided. The second bearing plate 2 is provided with an air channel 2e2 which extends within the second bearing plate 2 in a substantially C-shape in cross section shown in FIG. 9. The air channel 2e2 is provided, on an annular end surface of the boss 2e which faces the outer flange 11, with two outlets 2e3, and is further provided on an outer surface of the second bearing plate 2 with a connection hole 2e4 which communicatively connects with the two outlets 2e3. A compressed air pump P for supplying compressed air which is installed outside the one-way rotational transfer mechanism 100D is connected to the connection hole 2e4.

The length of the hollow-cylindrical rotary output shaft 20C is smaller than the length of the hollow-cylindrical rotary output shaft 20A of the first embodiment of the one-way rotational transfer mechanism 100A. The cylindrical inner peripheral surface 21 of the hollow-cylindrical rotary output shaft 20C is fitted on the outer peripheral surfaces of the bosses 1a, 2e and the outer flange 11 in a watertight fashion to be movable along the axis 10a of the rotary input shaft 10C and rotatable about the axis 10a.

The one-way rotational transfer mechanism 100D is provided therein with an annular space S which is surrounded by (defined by) the boss 2e, the outer flange 11, the rotary input shaft 10C and the hollow-cylindrical rotary output shaft 20C. The two outlets 2e3 of the second bearing plate 2 are opened to the annular space S. The annular space S, the compressed air pump P, the connection hole 2e4, the two outlets 2e3 and the air channel 2e2 are elements of a hydraulic biasing device of the one-way rotational transfer mechanism 100D which biases the outer flange 11 toward the boss 1a of the first bearing plate 1.

In the above described simple structure of the one-way rotational transfer mechanism 100D, supplying compressed air into the annular space S by the pump P through the connection hole 2e4, the air channel 2e2 and the two outlets 2*e*3 causes the outer flange 11 (the rotary input shaft 10C) to be continuously biased toward the boss 1*a* of the first bearing plate 1 by the air pressure in the annular space S, and accordingly, the orthogonal surface 13*a* of the outer flange 11 and each steel ball 23 are in intimate contact with each other (each ball 23 is sandwiched between the orthogonal surface 13*a* and the orthogonal end surface 1*b* of the boss 1*a*).

Therefore, similar to the first embodiment of the one-way rotational transfer mechanism, the hollow-cylindrical rotary output shaft 20C rotates if the rotary input shaft 10C is rotated, but the rotary input shaft 10C does not rotate even if the hollow-cylindrical rotary output shaft 20C is rotated because this rotation of the hollow-cylindrical rotary output shaft 20C is not transferred to the rotary input shaft 10C.

Additionally, in the one-way rotational transfer mechanism 100D, the rotary input shaft 10C can rotate very smoothly because very little friction is produced between the outer flange 11 and the compressed air supplied into the annular space S during rotation of the rotary input shaft 10C.

To reduce the resistance (frictional resistance) between the outer flange 11 and the hollow-cylindrical rotary output shaft 20C, an annular groove can be formed on an outer peripheral surface of the outer flange 11, while an O-ring can be fitted in this annular groove so that the outer edge of the O-ring comes in watertight contact with the cylindrical inner peripheral surface 21 of the hollow-cylindrical rotary output shaft 20C. In addition, to reduce the resistance (frictional resistance) between the boss 2*e* and the hollow-cylindrical rotary output shaft 20C, an annular groove can be formed on an outer peripheral surface of the boss 2*e*, while an O-ring can be fitted in this annular groove so that the outer edge of the O-ring comes in watertight contact with the cylindrical inner peripheral surface 21 of the hollow-cylindrical rotary output shaft 20C.

The compressed air pump P can be replaced by a pressure oil pump (not shown). In this case, the annular space S, the pressure oil pump, the connection hole 2*e*4, the two outlets 2*e*3 and the air channel 2*e*2 serve as elements of a hydraulic biasing device of the one-way rotational transfer mechanism 100D which biases the outer flange 11 toward the boss 1*a* of the first bearing plate 1. If an oil having a low viscosity is supplied into the annular space S by the pressure oil pump, friction produced between the outer flange 11 and the pressurized oil supplied into the annular space S during rotation of the rotary input shaft 10C is reduced to a minimum (extremely small) friction, which makes an extreme smooth rotation of the rotary input shaft 10C possible.

Any appropriate fluid other than air or oil can be used as a fluid for the hydraulic biasing device of the fourth embodiment of the one-way rotational transfer mechanism 100D.

In each of the above described one-way rotational transfer mechanisms 10A, 100B, 100C and 100D, if the hollow-cylindrical rotary output shaft (20A, 20B, 20C or 20D) is firmly held to be fixed forcibly relative to the first and second bearing plates 1 and 2, each steel ball 23 merely rotates in the associated accommodation space 22 while sliding on the orthogonal surface 13*a* and the orthogonal end surface 1*b* even when the rotary input shaft (10A, 10B or 10C) is driven to rotate, unless either the triangular prism portion 12 or the hollow-cylindrical rotary output shaft (20A, 20B, 20C or 20D) is broken. This means that each of the one-way rotational transfer mechanisms 100A, 100B, 100C and 100D can also serve as an output torque limiter. Torque which can be transferred from the rotary input shaft (10A, 10B or 10C) to the hollow-cylindrical rotary output shaft (20A, 20B, 20C or 20D) can be determined by the following factors: internal angles of the wedge-shaped opposite ends that are formed between the associated contact surface 12*a* and the cylindrical inner peripheral surface 21, the biasing force (spring force, magnetic force or hydraulic force) of the biasing device, the surface roughness of the orthogonal surface 13*a* and the orthogonal end surface 1*b* of the boss 1*a* (i.e., the friction between the orthogonal surface 13*a* and each steel ball 23, and between the orthogonal end surface 1*b* and each steel ball 23), and the like.

Figure 10:
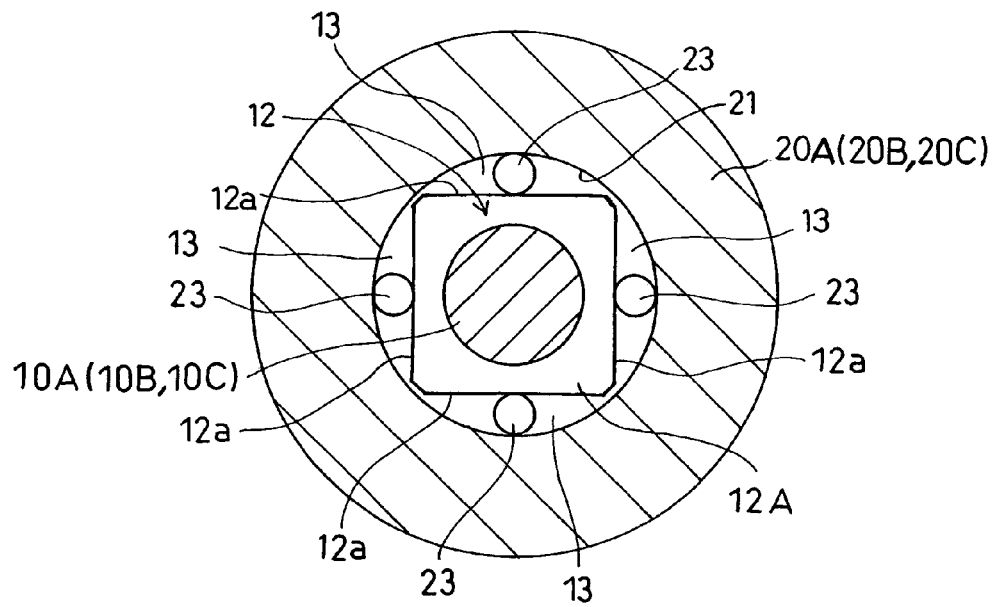
FIG. 10 is a cross sectional view of another embodiment of the circumferentially-uneven-width-space forming portion of the one-way rotational transfer mechanism according to the present invention.
Figure 11:
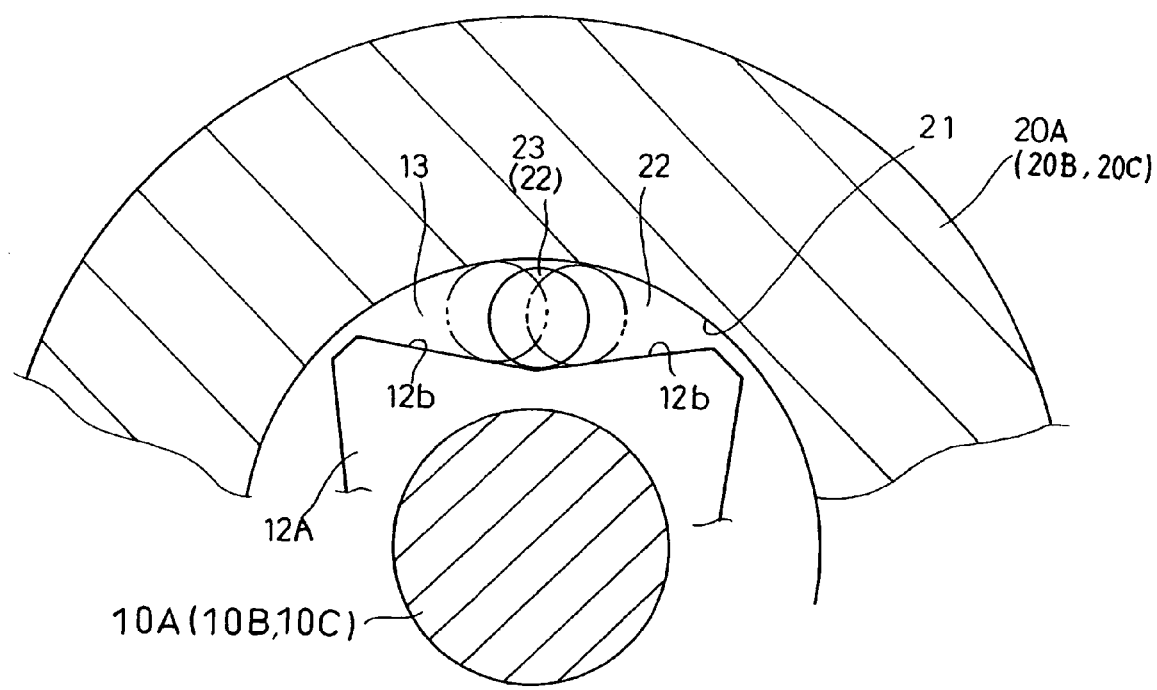
FIG. 11 is a cross sectional view of another embodiment of the circumferentially-uneven-width-space forming portion of the one-way rotational transfer mechanism according to the present invention.

If it is desired to change the number of the accommodation spaces 22 (the number of the steel balls 23), a polygonal prism portion other than the triangular prism portion 12 only needs to be formed on the rotary input shaft (10A, 10B or 10C). FIG. 10 shows another embodiment of the circumferentially-uneven-width-space forming portion. This embodiment of the circumferentially-uneven-width-space forming portion is formed as a substantially quadratic (rectangular) prism portion 12A having an even thickness in the axial direction of the rotary input shaft (10A, 10B or 10C). The outer peripheral surface of the quadratic prism portion 12A is provided with four contact surfaces 12*a* arranged at regular intervals of 90 degrees about the axis of the rotary input shaft (10A, 10B or 10C). Theoretically, the number of the accommodation spaces 22 (the number of the steel balls 23) can be one if balance does not have to be achieved (if balance can be achieved). Although each contact surface 12*a* is even and extends normal to a radial direction of the rotary input shaft (10A, 10B or 10C) in this embodiment shown in FIG. 10, each contact surface 12*a* can be modified as an uneven surface as shown in another embodiment of the circumferentially-uneven-width-space forming portion shown in FIG. 11. In this embodiment shown in FIG. 11, each contact surface of the substantially quadratic prism portion 12A that is in contact with the associated steel ball 23 is formed as a pair of inclined surfaces 12*b* which are symmetrical with respect to a line extending in a radial direction of the rotary input shaft (10A, 10B or 10C). According to this embodiment shown in FIG. 11, the internal angles of the aforementioned wedge-shaped opposite ends can be easily determined and adjusted. If the pair of inclined surfaces 12*b* are formed asymmetrical with respect to a line extending in a radial direction of the rotary input shaft (10A, 10B or 10C), the torque which is transferred from the rotary input shaft (10A, 10B or 10C) to the hollow-cylindrical rotary output shaft (20A, 20B, 20C or 20D) when the rotary input shaft (10A, 10B or 10C) is driven to rotate in a forward rotational direction can be set different from when the rotary input shaft (10A, 10B or 10C) is driven to rotate in a reverse rotational direction.

Figure 12:
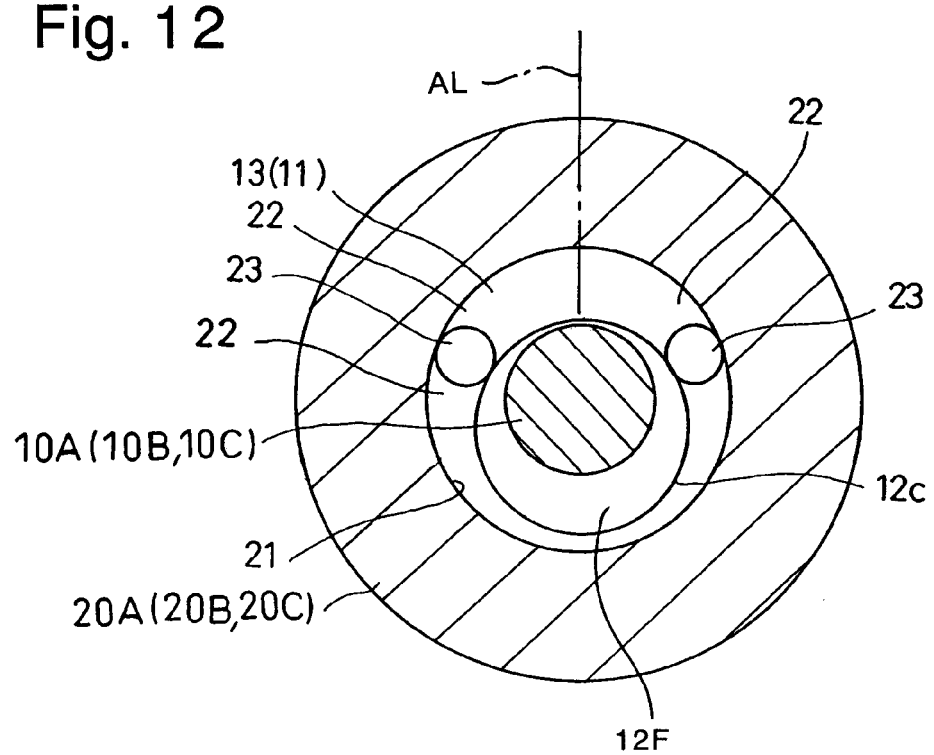
FIG. 12 is a cross sectional view of another embodiment of the circumferentially-uneven-width-space forming portion of the one-way rotational transfer mechanism according to the present invention.

An eccentric cylindrical surface eccentric from the axis of the rotary input shaft (10A, 10B or 10C) can serve as the circumferentially-uneven-width-space forming portion. FIG. 12 shows another embodiment of the circumferentially-uneven-width-space forming portion. In this embodiment of the circumferentially-uneven-width-space forming portion, a cylindrical-plate portion 12F is provided having an eccentric cylindrical surface 12*c* which is eccentric from the axis of the rotary input shaft (10A, 10B or 10C). In this embodiment, two steel balls 23 are installed in a single accommodation space 22 which is formed symmetrical to a straight line AL extending in a radial direction (and in a vertical direction in FIG. 12) of the rotary input shaft (10A, 10B or 10C). This embodiment is effective on condition that the two steel balls 23 stably remain in the accommodation space 22 on opposite sides of the straight line AL, respectively, i.e., so long as both the two steel balls 23 do not move to either one of the opposite sides of the accommodation space 22 with respect to the straight line AL.

In each embodiment described above, although formed on the outer flange 11, the orthogonal surface 13a can be formed on a surface of any other member.

Figure 14:
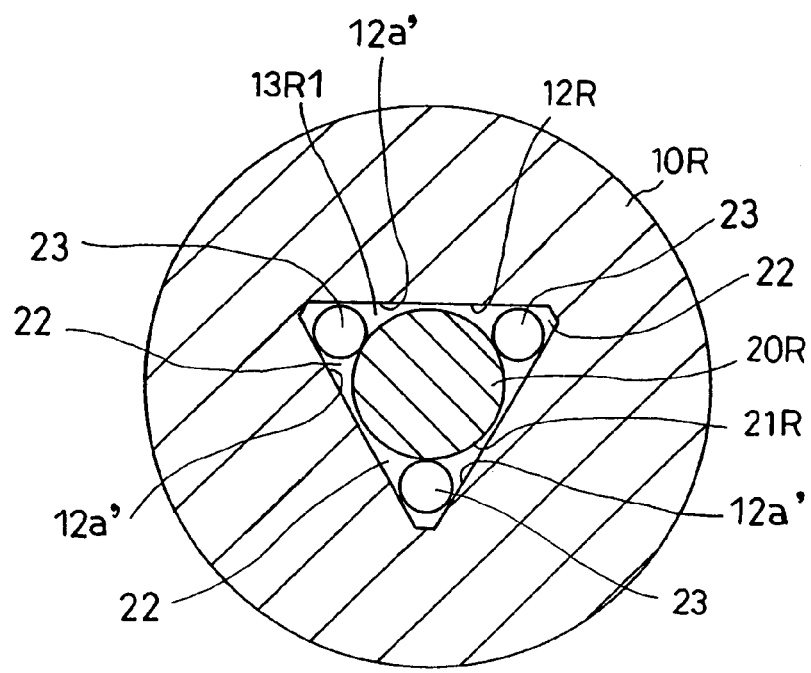
FIG. 14 is a cross sectional view taken along XIV-XIV line shown in FIG. 13, showing an embodiment of the circumferentially-uneven-width-space forming portion of the one-way rotational transfer mechanism shown in FIG. 13.
Figure 13:
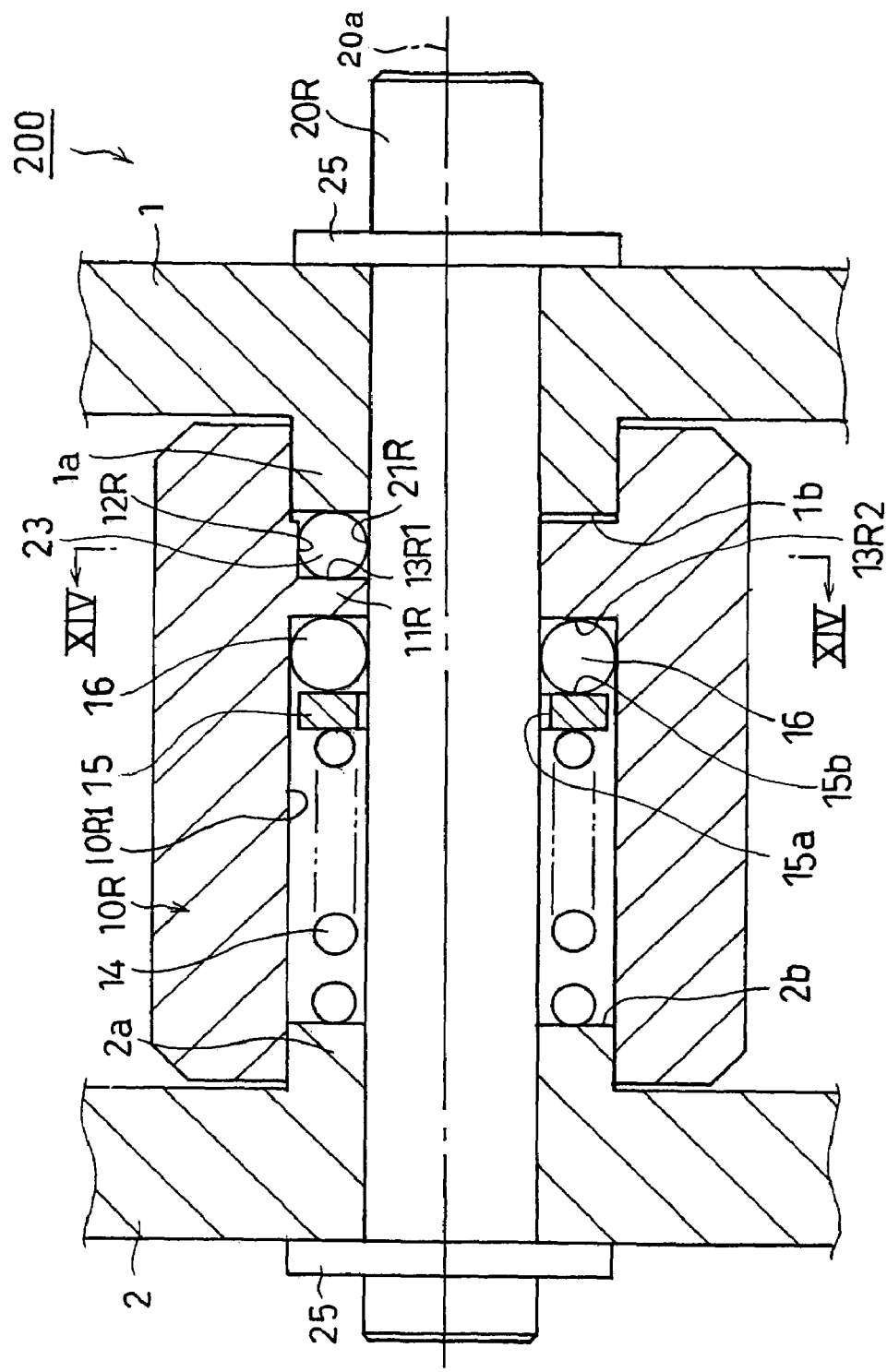
FIG. 13 is a longitudinal cross sectional view of a fifth embodiment of the one-way rotational transfer mechanism according to the present invention.
Figure 15:
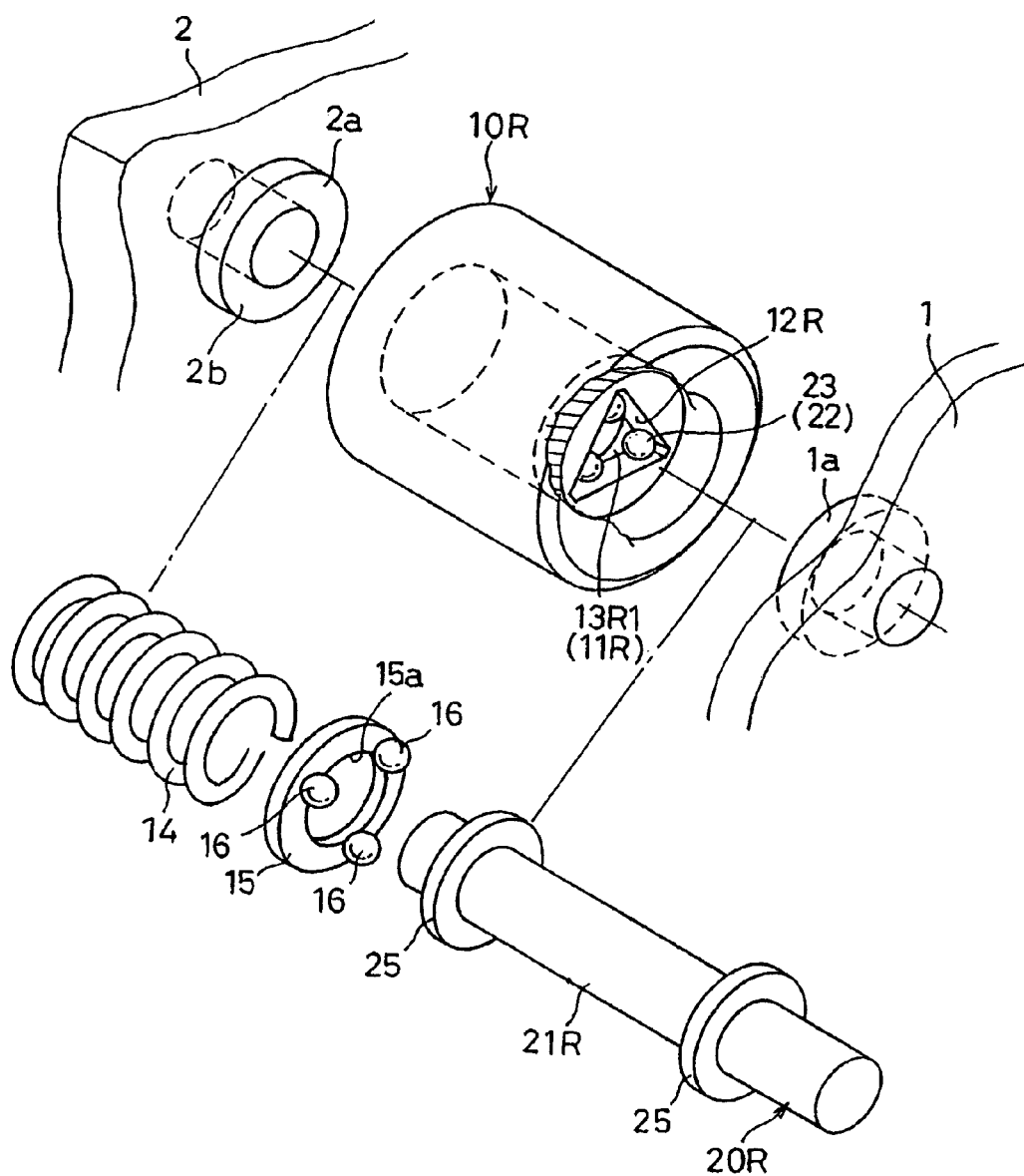
FIG. 15 is an exploded perspective view, partly cutaway, of the one-way rotational transfer mechanism shown in FIG. 13.

FIGS. 13 through 15 show the fifth embodiment of the one-way rotational transfer mechanism according to the present invention. In this embodiment of the one-way rotational transfer mechanism 200, elements and parts similar to those in the first embodiment of the one-way rotational transfer are designated by the same reference numerals. In this embodiment, the rotary input shaft is positioned around the rotary output shaft, whereas in each of the first through fourth embodiments of the one-way rotational transfer mechanisms the rotary output shaft is positioned around the rotary input shaft. Namely, the one-way rotational transfer mechanism 200 is provided with a rotary output shaft 20R which is fitted in respective central holes of the bosses 1a and 2a so that the rotary output shaft 20R is freely rotatable on the axis of the bosses 1a and 2a, while the one-way rotational transfer mechanism 200 is provided, on outer peripheral surfaces of the bosses 1a and 2a between the first and the second bearing plates 1 and 2, with a hollow-cylindrical rotary input shaft 10R which is positioned concentrically to the rotary output shaft 20R. The hollow-cylindrical rotary input shaft 10R is freely rotatable about an axis 20a of the rotary output shaft 20R relative to the bosses 1a and 2a, and freely slidable within the bosses 1a and 2a in a direction of the axis 20a. The hollow-cylindrical rotary input shaft 10R is provided on an inner peripheral surface thereof with an inner flange 11R, and is further provided, on one side (right side as viewed in FIG. 13) of the inner flange 11R inside the hollow-cylindrical rotary input shaft 10R, with a triangular-prism-shaped space 12R serving as a circumferentially-uneven-width-space forming portion (portion having a non-circular cross section). The inner flange 11R is provided on one side (right side as viewed in FIG. 13) thereof adjacent to the triangular-prism-shaped space 12R with an orthogonal surface (normal surface) 13R1 which lies in a plane normal to the axis of the hollow-cylindrical rotary input shaft 10R. The inner flange 11R is provided on the other side (left side as viewed in FIG. 13) thereof with an orthogonal holding surface (first holding surface) 13R2 which lies in a plane normal to the axis of the hollow-cylindrical rotary input shaft 10R. The triangular-prism-shaped space 12R is surrounded and formed by a portion of the inner peripheral surface of the hollow-cylindrical rotary input shaft 10R. Three accommodation spaces 22 are defined within the triangular-prism-shaped space 12R between the orthogonal surface 13R1 of the inner flange 11R and the orthogonal end surface 1b of the boss 1a around an outer peripheral surface 21R of the rotary output shaft 20R that extends through the central portion of the hollow-cylindrical rotary input shaft 10R (see FIG. 14). The rotary output shaft 20R is provided thereon with two outer stop flanges 25, which are respectively in contact with outer surfaces of the first and second bearing plates 1 and 2 to prevent the rotary output shaft 20R from coming out of the first and second bearing plates 1 and 2. The orthogonal surface 13R1 of the inner flange 11R serves as a normal surface which lies in a plane normal to the axis of the hollow-cylindrical rotary input shaft 10R, while the orthogonal end surface 1b of the boss 1a serves a second normal surface which faces the first normal surface (i.e., the orthogonal surface 13R1) and is parallel thereto. An inner peripheral surface of the hollow-cylindrical rotary input shaft 10R which forms the triangular-prism-shaped space 12R has three contact surfaces 12a' arranged at regular intervals of 120 degrees about the axis of the hollow-cylindrical rotary input shaft 10R. Each contact surface 12a' is a flat surface, and extends normal to a radial direction of the hollow-cylindrical rotary input shaft 10R. Each of the first holding surface 13R2, the orthogonal surface 13R1 and the second orthogonal end surface 1b is normal to the axis 20a of the rotary output shaft 20R.

The one-way rotational transfer mechanism 200 is provided on the rotary output shaft 20R between the inner flange 11R and the boss 2a with an annular member 15 having a central hole 15a greater in diameter than the rotary output shaft 20R. The annular member 15 is fitted on the rotary output shaft 20R to be movable along the axis 20a of the rotary output shaft 20R relative to the rotary output shaft 20R and rotatable about the axis 20a relative to the rotary output shaft 20R. An orthogonal surface (second holding surface) 15b of the annular member 15 which is adjacent to the inner flange 11R is parallel to the first holding surface 13R2. The one-way rotational transfer mechanism 200 is provided in an annular space between the first holding surface 13R2 and the second holding surface 15b with a plurality of balls (e.g., steel balls of a conventional ball bearing which are similar to the steel balls 23) 16. Each ball 16 can freely rotate on its axis in the annular space and revolve around the rotary output shaft 20R.

The one-way rotational transfer mechanism 200 is provided, around the rotary output shaft 20R between the annular member 15 and the boss 2a, with a compression coil spring (biasing device) 14. The compression coil spring 14 biases the annular member 15 toward the inner flange 11R so that the plurality of balls 16 are sandwiched between the first holding surface 13R2 of the inner flange 11R and the second holding surface 15b of the annular member 15 so that the three steel balls 23 are pressed against both the orthogonal surface 13R1 and the orthogonal end surface 1b by the spring force of the compression coil spring 14 which is transferred to the inner flange 11R via the annular member 15 and the plurality of balls 16.

The three steel balls 23 are installed in the three accommodation spaces 22, respectively. The compression coil spring 14 biases the inner flange 11R along the axis of the rotary output shaft 20R in a direction to move the orthogonal surface 13R1 of the inner flange 11R toward the orthogonal end surface 1b of the boss 1a so that the three steel balls 23 are held tight between the orthogonal surface 13R1 and the orthogonal end surface 1b.

According to the fifth embodiment of the one-way rotational transfer mechanism shown in FIGS. 13 through 15, an effect similar to the effect obtained in the first embodiment of the one-way rotational transfer mechanism is obtained.

Namely, when the hollow-cylindrical rotary input shaft 10R is driven to rotate, each steel ball 23 rotates by rotation of the orthogonal surface 13R1 to move in a direction to get into one of wedge-shaped opposite ends which are formed in the associated accommodation space 22 between the associated contact surface 12a' and the outer peripheral surface 21R of the rotary output shaft 20R. Consequently, the rotation of the hollow-cylindrical rotary input shaft 10R is transferred to the rotary output shaft 20R. However, if a rotation is applied to the rotary output shaft 20R, each steel ball 23 merely rotates in the associated accommodation space 22 by the rotation of the outer peripheral surface 21R of the rotary output shaft 20R, and accordingly, the rotation of the rotary output shaft 20R is not transferred to the hollow-cylindrical rotary input shaft 10R.

Similar to the first embodiment of the one-way rotational transfer mechanism, the frictional resistance between the balls 16 and the first holding surface 13R2 of the inner flange 11R is extremely small compared with the case of using neither the annular member 15 nor the balls 16 (the case where the compression coil spring 14 is brought into contact directly with the first holding surface 13R2). Accordingly, the resistance to the hollow-cylindrical rotary input shaft 10R during rotation thereof is extremely small, which makes an extreme smooth rotation of the hollow-cylindrical rotary input shaft 10R possible.

Figure 16:
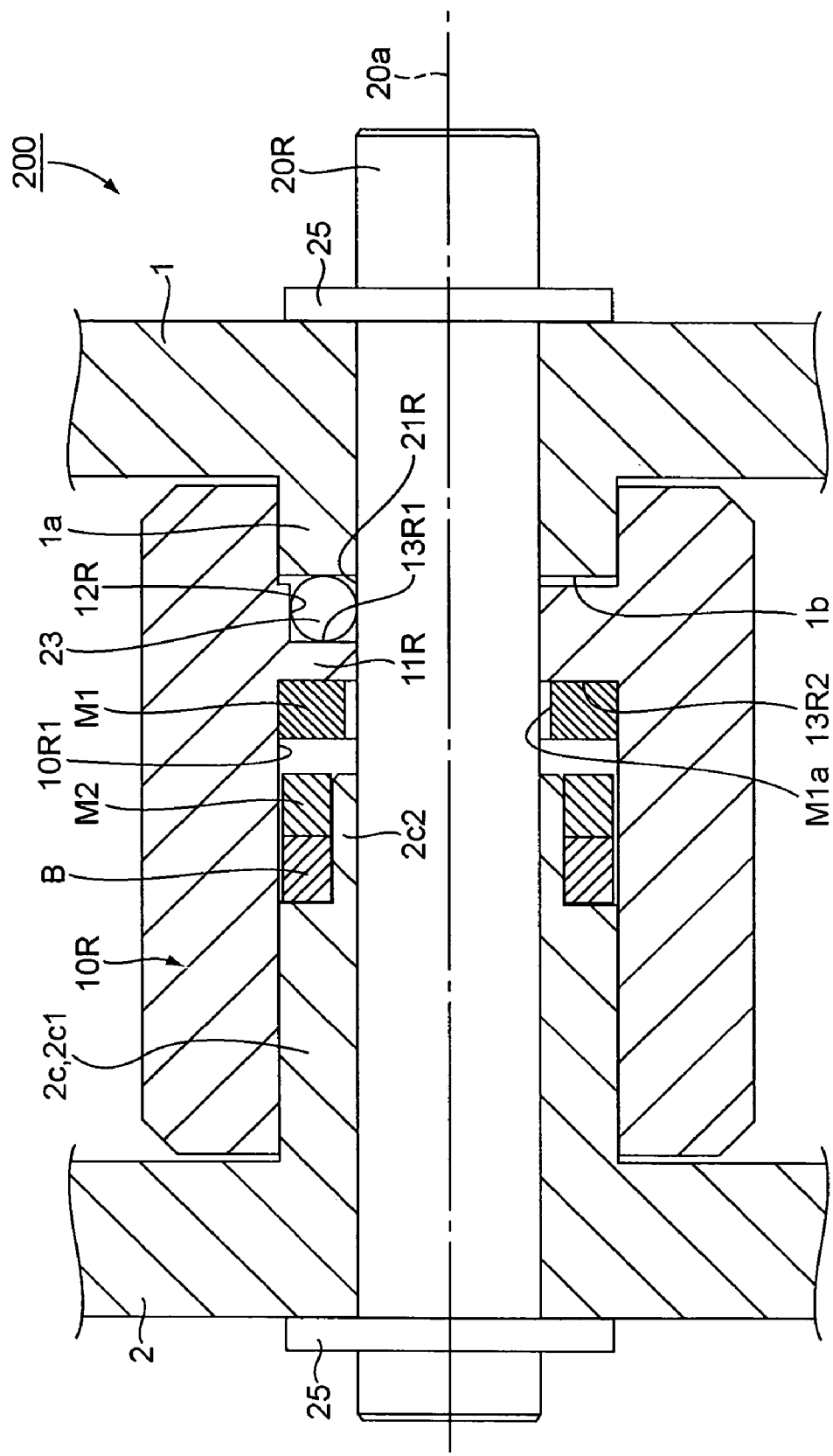
FIG. 16 is a cross sectional view of a modification of the fifth embodiment wherein a magnetic biasing device is applied to the present invention.
Figure 17:
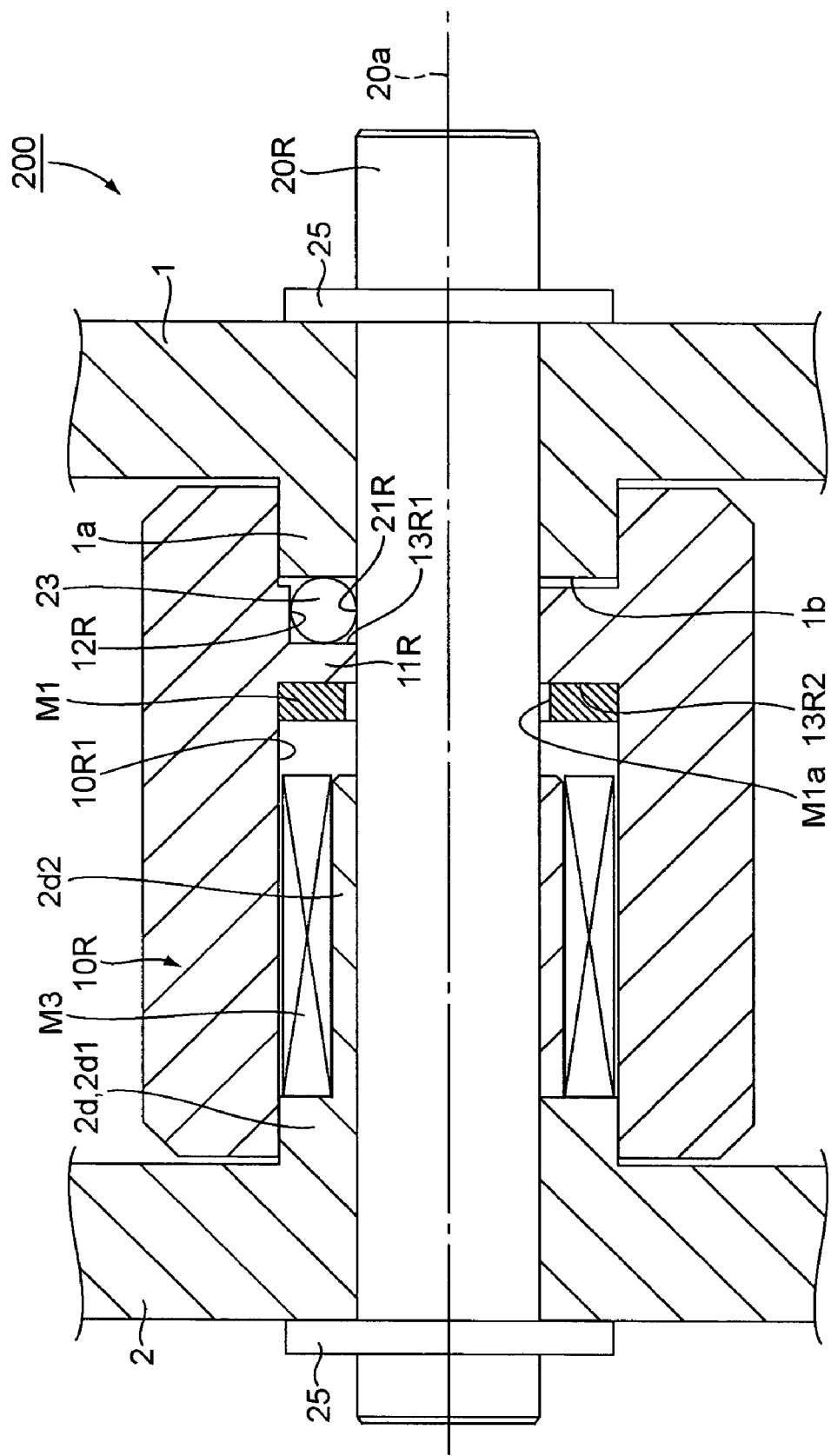
FIG. 17 is a cross sectional view of another modification of the fifth embodiment wherein another magnetic biasing device is applied to the present invention.
Figure 18:
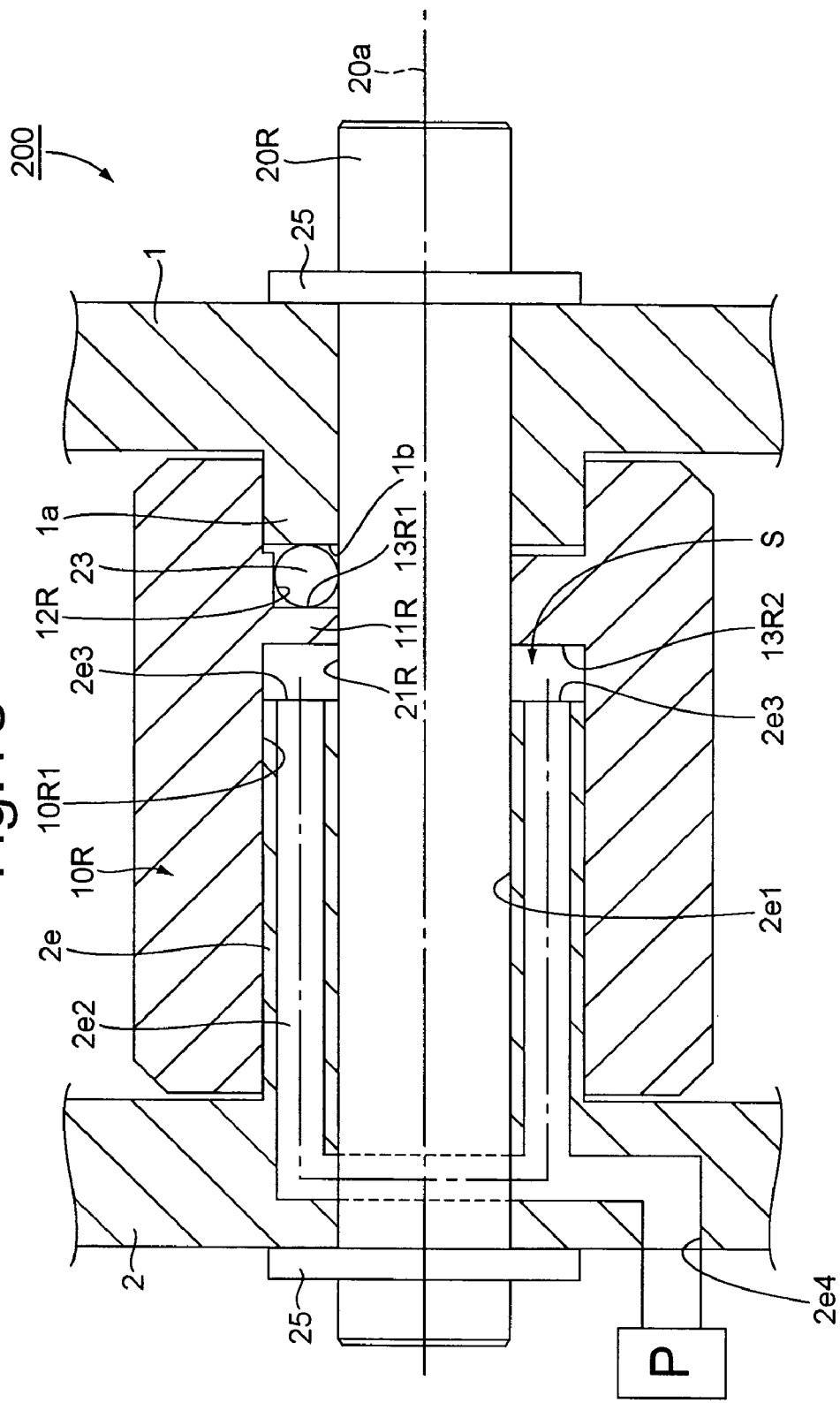
FIG. 18 is a cross sectional view of another modification of the fifth embodiment wherein hydraulic biasing device is applied to the present invention.

The one-way rotational transfer mechanism 200 can be modified by replacing the compression coil spring (biasing device) 14 with alternative embodiments of biasing devices shown in FIGS. 16 through 18.

FIG. 16 shows a magnetic biasing device as a modified embodiment of the biasing device shown in FIGS. 5 through 7. A boss 2c of the second bearing plate 2 is similar to that of FIGS. 5 through 7. A spacer B, having an annular shape, is fitted on a small-diameter portion 2c2 and abuts against an orthogonal surface of a large-diameter portion 2c1 of the boss 2c. A ring-shaped second permanent magnet M2 is fixed to the surface of the spacer B on the boss 1a side. A ring-shaped first permanent magnet M1 is fitted against the orthogonal holding surface 13R2 of the inner flange 11R and an inner peripheral surface 10R1 (the central axis thereof being coincident with the axis 20a) of the rotary input shaft 10R, so that the rotary output shaft 20R is fitted though a central hole M1a of the ring-shaped first permanent magnet M1 so as to be relatively movable therethrough having a certain amount of play therebetween. The inner peripheral surface 10R1 of the rotary input shaft 10R is supported on the large-diameter portion 2c1 so as to the relatively rotatable thereto and be relatively movable in the direction of the axis 20a.

FIG. 17 shows a magnetic biasing device as a modified embodiment of the biasing device shown in FIG. 8. A boss 2d of the second bearing plate 2 is similar to that of FIG. 8. Coil electric wire wound around a small-diameter portion 2d2 of the boss 2d constitutes an electromagnet M3. The inner peripheral surface 10R1 of the rotary input shaft 10R is supported on a large-diameter portion 2d1 so as to be relatively rotatable thereto and be relatively movable in the direction of the axis 20a. The first permanent magnet M1 is fixed to the rotary input shaft 10R similar to the embodiment of FIG. 16.

FIG. 18 shows a hydraulic biasing device as a modified embodiment of the biasing device shown in FIG. 9. A boss 2e of the second bearing plate 2 is similar to that of FIG. 9. The second bearing plate 2 (boss 2e) is provided with a central hole 2e1, an air channel 2e2, two outlets 2e3, and a connection hole 2e4. A compressed air pump P for supplying compressed air which is installed outside the one-way rotational transfer mechanism 200 is connected to the connection hole 2e4. The inner peripheral surface 10R1 of the rotary input shaft 10R is rotatably supported on the boss 2e in a watertight fashion so as to be relatively movable in the direction of the axis 20a. The one-way rotational transfer mechanism 200 is provided therein with an annular space S which is surrounded by (defined by) the boss 2e, the inner flange 11, the rotary input shaft 10R and the rotary output shaft 20R. In this modified embodiment, air can also be replaced with oil, or another appropriate fluid.

The structure of the one-way rotational transfer mechanism 200 shown in FIGS. 16 through 18 can achieve similar effects to that of FIGS. 13 through 15, and also can achieve similar effects to those of the embodiments of the biasing devices of FIGS. 5 through 9.

Figure 19:
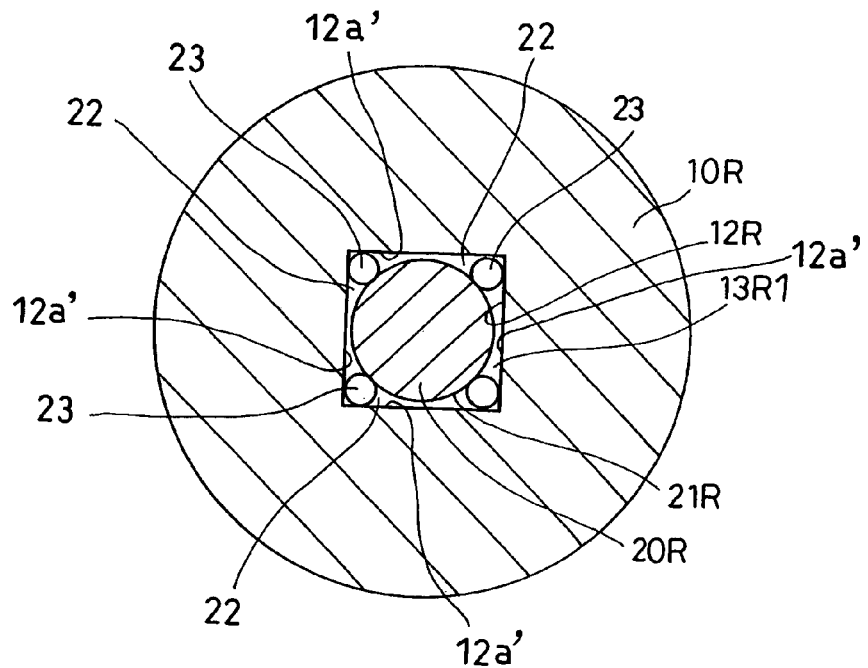
FIG. 19 is a cross sectional view of another embodiment of the circumferentially-uneven-width-space forming portion of the one-way rotational transfer mechanism shown in FIG. 13.

FIG. 19 shows another embodiment of the circumferentially-uneven-width-space forming portion of the fifth embodiment of the one-way rotational transfer mechanism 200. This embodiment is provided with a square-prism-shaped space 12R serving as the circumferentially-uneven-width-space forming portion (portion having a non-circular cross section) instead of the triangular-prism-shaped space 12R shown in FIGS. 13 through 15. Four steel balls 23 are installed in the four accommodation spaces 22, respectively. According to the embodiment shown in FIG. 19, the internal angle of each of the wedge-shaped opposite ends that are formed in each accommodation space 22 by the contact surfaces 12a' and the rotary output shaft 20R is greater than that of the embodiment shown in FIGS. 13 through 15. Accordingly, the embodiment shown in FIG. 19 is effectively used, especially when the torque which is transferred from the hollow-cylindrical rotary input shaft 10R to the rotary output shaft 20R is small. Nevertheless, the maximum transferable torque can be increased by using smaller steel balls, which makes it possible to decrease the internal angles of the wedge-shaped opposite ends. This embodiment shown in FIG. 19 can be modified to be provided with an eccentric cylindrical surface corresponding to the eccentric cylindrical surface 12c shown in FIG. 12.

Figure 21:
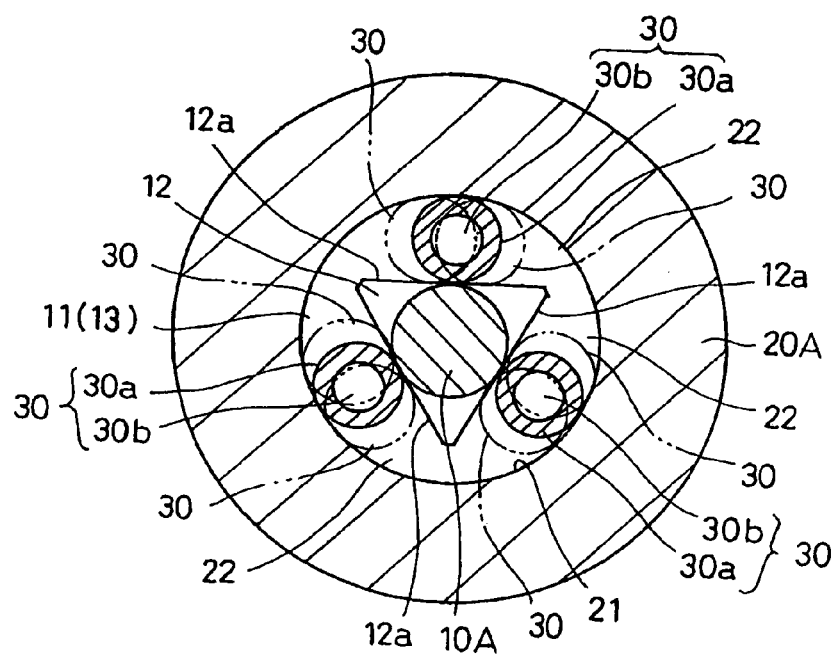
FIG. 21 is a cross sectional view taken along XXI-XXI line shown in FIG. 17.
Figure 20:
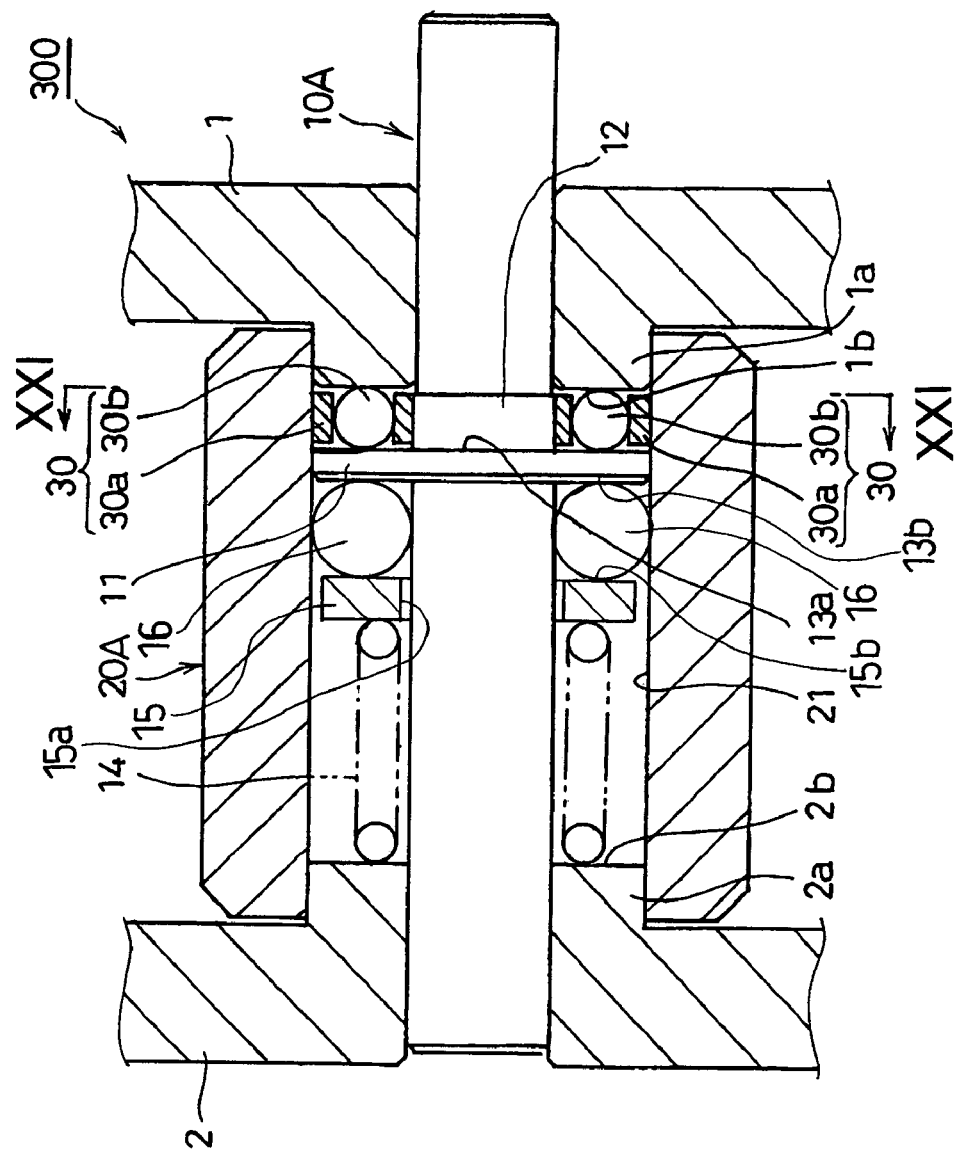
FIG. 20 is a longitudinal cross sectional view of a sixth embodiment of the one-way rotational transfer mechanism according to the present invention which uses ball-incorporated hollow-cylindrical rollers instead of simple steel balls.
Figure 22:
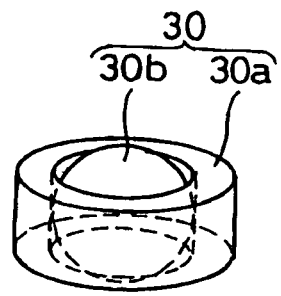
FIG. 22 is a perspective view of a ball-incorporated hollow-cylindrical roller shown in FIGS. 20 and 21.

FIGS. 20 through 22 show a sixth embodiment of the one-way rotational transfer mechanism according to the present invention. This embodiment of the one-way rotational transfer mechanism 300 is substantially the same as the first embodiment of the one-way rotational transfer mechanism 100A except that the one-way rotational transfer mechanism 300 uses ball-incorporated hollow-cylindrical rollers (roller members) 30 instead of the simple steel balls 23. As shown in FIG. 22, the ball-incorporated hollow-cylindrical rollers 30 are provided with a hollow cylindrical ring (hollow cylindrical roller) 30a and a steel ball 30b which is loosely fitted in the hollow cylindrical ring 30a. Similar to the steel balls 23 of the one-way rotational transfer mechanism 10A, hardened steel balls of a conventional ball bearing can be used as the steel balls 30b. The axial lengths of the hollow cylindrical rings 30a are slightly smaller than the diameters of the steel balls 30b. As shown in FIG. 21, the three ball-incorporated hollow-cylindrical rollers 30 are respectively installed in the three accommodation spaces 22 so that the axis of each ring 30a extends substantially parallel to the respective axes of the rotary input shaft 10A and the hollow-cylindrical rotary output shaft 20A and so that each ball-incorporated hollow-cylindrical roller 30 can move on the associated contact surface 12a in the associated accommodation space 22. Accordingly, the outer peripheral surfaces of the hollow cylindrical rings 30a (of the ball-incorporated hollow-cylindrical rollers 30) can contact the contact surfaces 12a of the triangular prism portion 12 and the cylindrical inner peripheral surface 21 of the rotary output shaft 20A. The steel balls 30b are held tight between the orthogonal surface 13a and the orthogonal end surface 1b of the boss 1a by the spring force of the compression coil spring 14, whereas the rings 30a are not held tight between the orthogonal surface 13a and the orthogonal end surface 1b of the boss 1a because the axial lengths of the hollow cylindrical rings 30a are slightly smaller than the diameters of the steel balls 30b. According to this embodiment of the one-way rotational transfer mechanism 300, an effect similar to the effect obtained in the first embodiment of the one-way rotational transfer mechanism is obtained. In addition, a greater torque can be transferred from the rotary input shaft 10A to the hollow-cylindrical rotary output shaft 20A compared with the first embodiment of the one-way rotational transfer mechanism because the ring 30a of each ball-incorporated hollow-cylindrical roller 30 can come into surface contact with each of the associated contact surface 12a of the triangular prism portion 12 and the cylindrical inner peripheral surface 21 of the hollow-cylindrical rotary output shaft 20A.

The steel balls 23 can be respectively replaced by the ball-incorporated hollow-cylindrical rollers 30 in each embodiment shown in FIGS. 5 through 19 to obtain a similar effect.

Figure 23:
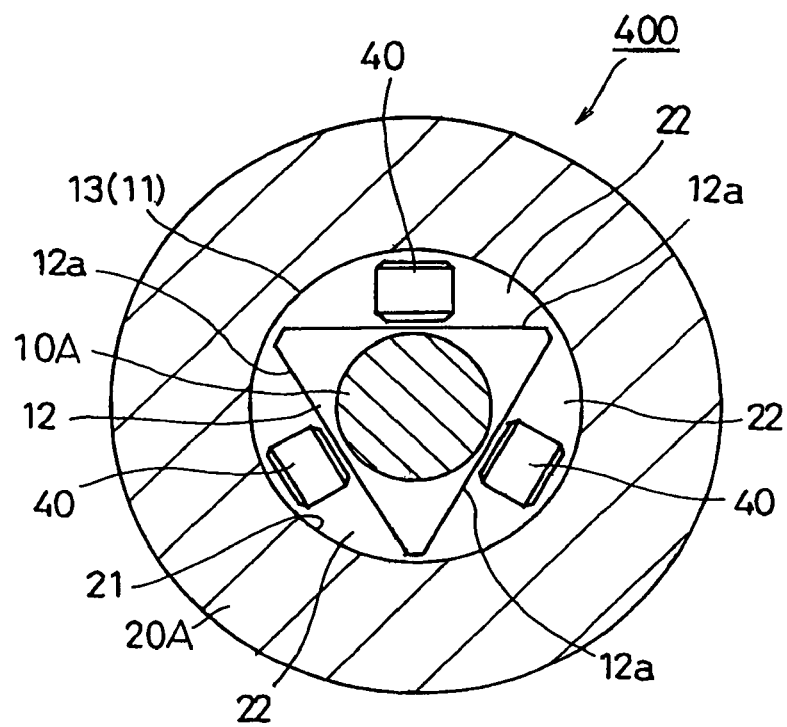
FIG. 23 is a longitudinal cross sectional view of a modified embodiment of the one-way rotational transfer mechanism shown in FIG. 1 which uses cylindrical column rollers instead of simple steel balls.

FIG. 23 shows a seventh embodiment of the one-way rotational transfer mechanism according to the present invention. This embodiment of the one-way rotational transfer mechanism 400 is substantially the same as the first embodiment of the one-way rotational transfer mechanism 100A except that the one-way rotational transfer mechanism 400 uses cylindrical column rollers (roller members) 40 instead of the simple steel balls 23. As shown in FIG. 23, the annular edge of each axial end of each cylindrical column roller 40 is beveled. The cylindrical column rollers 40 are respectively installed in the three accommodation spaces 22 so that the axis of each cylindrical column roller 40 extends in a substantially radial direction of the rotary input shaft 10A as shown in FIG. 23 and so that each cylindrical column roller 40 can move in the associated accommodation space 22 with an outer peripheral surface of the cylindrical column roller 40 remaining in contact with the orthogonal surface 13a of the outer flange 11 and the orthogonal end surface 1b of the boss 1a. The cylindrical column rollers 40 are held tight between the orthogonal surface 13a of the outer flange 11 and the orthogonal end surface 1b of the boss 1a by the spring force of the compression coil spring 14. According to the seventh embodiment of the one-way rotational transfer mechanism 400, an effect similar to the effect obtained in the first embodiment of the one-way rotational transfer mechanism is obtained.

The steel balls 23 can be respectively replaced by the cylindrical column rollers 40 in each embodiment shown in FIGS. 5 through 19 to obtain a similar effect.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A one-way rotational transfer mechanism comprising:
a rotary input shaft having a normal surface and a first holding surface which respectively lie in two separate parallel planes normal to an axis of said rotary input shaft;
a hollow-cylindrical rotary output shaft, having a cylindrical inner peripheral surface, positioned around said rotary input shaft to be freely rotatable relative to said rotary input shaft;
a circumferentially-uneven-width-space forming portion formed on said rotary input shaft adjacent to said normal surface to form at least one accommodation space between said rotary input shaft and said cylindrical inner peripheral surface;
a movable member, movable along said axis of said rotary input shaft, which is positioned so that said first holding surface is positioned between said movable member and said normal surface, said movable member having a second holding surface which faces said first holding surface, said second holding surface being normal to said axis;
a plurality of balls positioned between said first holding surface and said second holding surface;
at least one roller member installed in said accommodation space; and
a biasing device which biases said movable member toward said first holding surface so that said balls are sandwiched between said first holding surface and said second holding surface and so that said normal surface and said roller member come into pressing contact with each other,
wherein said circumferentially-uneven-width-space forming portion is shaped so that a rotation of said rotary input shaft is transferred to said hollow-cylindrical rotary output shaft via said roller member to which said rotation is applied from said normal surface when said rotary input shaft is rotated.

2. The one-way rotational transfer mechanism according to claim 1, wherein said roller member comprises a ball.

3. The one-way rotational transfer mechanism according to claim 1, wherein said roller member comprises:
a ball; and
a ring in which said ball is loosely fitted,
wherein an axial length of said ring is smaller than a diameter of said ball; and
wherein said ring is positioned in associated said accommodation space so that an axis of said ring extends substantially parallel to each of said axis of said rotary input shaft and an axis of said hollow-cylindrical rotary output shaft.

4. The one-way rotational transfer mechanism according to claim 1, wherein said roller member comprises a cylindrical column roller which is positioned in associated said accommodation space so that an axis of said cylindrical column roller extends substantially in a radial direction of said rotary input shaft.

5. The one-way rotational transfer mechanism according to claim 1, wherein said rotary input shaft comprises an outer flange on which said normal surface is formed.

6. The one-way rotational transfer mechanism according to claim 1, wherein said circumferentially-uneven-width-space forming portion comprises a portion having a non-circular cross section which includes at least one surface normal to a radial direction of said rotary input shaft.

7. The one-way rotational transfer mechanism according to claim 6, wherein said circumferentially-uneven-width-space forming portion having said non-circular cross section is in the shape of a polygon.

8. The one-way rotational transfer mechanism according to claim 1, wherein said circumferentially-uneven-width-space forming portion comprises at least one pair of inclined surfaces which are symmetrical with respect to a line extending in a radial direction of said rotary input shaft.

9. The one-way rotational transfer mechanism according to claim 1, wherein said circumferentially-uneven-width-space forming portion comprises an eccentric cylindrical surface which is eccentric from said axis of said rotary input shaft.

10. A one-way rotational transfer mechanism comprising:
a rotary input shaft having a normal surface and a first holding surface which respectively lie in two separate parallel planes normal to an axis of said rotary input shaft;
a hollow-cylindrical rotary output shaft, having a cylindrical inner peripheral surface, positioned around said rotary input shaft to be freely rotatable relative to said rotary input shaft;

a bearing for supporting said rotary input shaft and said hollow-cylindrical rotary output shaft to allow each of said rotary input shaft and said hollow-cylindrical rotary output shaft to be freely rotatable relative to said bearing;

a second normal surface formed on said bearing, facing said normal surface to be parallel to said normal surface, and positioned so that said normal surface is positioned between said second normal surface and said first holding surface;

a circumferentially-uneven-width-space forming portion formed between said normal surface and said second normal surface to form at least one accommodation space between said rotary input shaft and said cylindrical inner peripheral surface;

a movable member, movable along said axis of said rotary input shaft, which is positioned so that said first holding surface is positioned between said movable member and said normal surface, said movable member having a second holding surface which faces said first holding surface, said second holding surface being normal to said axis;

a plurality of balls positioned between said first holding surface and said second holding surface;

at least one roller member installed in said accommodation space; and a biasing device which biases said movable member toward said first holding surface so that said balls are sandwiched between said first holding surface and said second holding surface and so that said roller member comes into pressing contact with said normal surface and said second normal surface, wherein said circumferentially-uneven-width-space forming portion is shaped so that a rotation of said rotary input shaft is transferred to said hollow-cylindrical rotary output shaft via said roller member to which said rotation is applied from said normal surface when said rotary input shaft is rotated.

11. A one-way rotational transfer mechanism comprising:

a rotary input shaft having a normal surface lying in a plane normal to an axis of said rotary input shaft;

a hollow-cylindrical rotary output shaft, having a cylindrical inner peripheral surface, positioned around said rotary input shaft to be freely rotatable relative to said rotary input shaft;

a circumferentially-uneven-width-space forming portion formed on said rotary input shaft to be adjacent to said normal surface to form at least one accommodation space between said rotary input shaft and said cylindrical inner peripheral surface;

at least one roller member installed in said accommodation space; and a magnetic biasing device which biases said rotary input shaft along said axis thereof by a magnetic force in a direction so that said normal surface and said roller member come into pressing contact with each other, wherein said circumferentially-uneven-width-space forming portion is shaped so that a rotation of said rotary input shaft is transferred to said hollow-cylindrical rotary output shaft via said roller member to which said rotation is applied from said normal surface when said rotary input shaft is rotated.

12. A one-way rotational transfer mechanism comprising:

a rotary input shaft having an normal surface lying in a plane normal to an axis of said rotary input shaft;

a hollow-cylindrical rotary output shaft, having a cylindrical inner peripheral surface, positioned around said rotary input shaft to be freely rotatable relative to said rotary input shaft;

a circumferentially-uneven-width-space forming portion formed on said rotary input shaft to be adjacent to said normal surface to form at least one accommodation space between said rotary input shaft and said cylindrical inner peripheral surface;

at least one roller member installed in said accommodation space; and a hydraulic biasing device which biases said rotary input shaft along said axis thereof by a hydraulic force in a direction so that said normal surface and said roller member come into pressing contact with each other, wherein said circumferentially-uneven-width-space forming portion is shaped so that a rotation of said rotary input shaft is transferred to said hollow-cylindrical rotary output shaft via said roller member to which said rotation is applied from said normal surface when said rotary input shaft is rotated.

13. A one-way rotational transfer mechanism comprising:

a rotary output shaft;

a hollow-cylindrical rotary input shaft positioned around said rotary output shaft to be freely rotatable relative to said rotary output shaft about an axis thereof, said hollow-cylindrical rotary input shaft having a normal surface and a first holding surface which respectively lie in two separate parallel planes normal to an axis of said hollow-cylindrical rotary input shaft;

a circumferentially-uneven-width-space forming portion formed on an inner peripheral surface of said hollow-cylindrical rotary input shaft to be adjacent to said normal surface to form at least one accommodation space between said hollow-cylindrical rotary input shaft and an outer peripheral surface of said rotary output shaft;

a movable member, movable along said axis of said hollow-cylindrical rotary input shaft, which is positioned so that said first holding surface is positioned between said movable member and said normal surface, said movable member having a second holding surface which faces said first holding surface, said second holding surface being normal to said axis;

a plurality of balls positioned between said first holding surface and said second holding surface;

at least one roller member installed in said accommodation space; and a biasing device which biases said movable member toward said first holding surface so that said balls are sandwiched between said first holding surface and said second holding surface and so that said normal surface and said roller member come into pressing contact with each other, wherein said circumferentially-uneven-width-space forming portion is shaped so that a rotation of said hollow-cylindrical rotary input shaft is transferred to said rotary output shaft via said roller member to which said rotation is applied from said normal surface when said hollow-cylindrical rotary input shaft is rotated.

14. A one-way rotational transfer mechanism comprising:

a rotary output shaft;

a hollow-cylindrical rotary input shaft positioned around said rotary output shaft to be freely rotatable relative to said rotary output shaft about an axis thereof, said hollow-cylindrical rotary input shaft having a normal surface and a first holding surface which respectively lie in two separate parallel planes normal to an axis of said hollow-cylindrical rotary input shaft;
a bearing for supporting said hollow-cylindrical rotary input shaft and said rotary output shaft to allow each of said hollow-cylindrical rotary input shaft and said rotary output shaft to be freely rotatable relative to said bearing;
a second normal surface formed on said bearing, facing said normal surface to be parallel to said normal surface, and positioned so that said normal surface is positioned between said second normal surface and said first holding surface;
a circumferentially-uneven-width-space forming portion formed between said normal surface and said second normal surface to form at least one accommodation space between said hollow-cylindrical rotary input shaft and an outer peripheral surface of said rotary output shaft;
a movable member, movable along said axis of said hollow-cylindrical rotary input shaft, which is positioned so that said first holding surface is positioned between said movable member and said normal surface, said movable member having a second holding surface which faces said first holding surface, said second holding surface being normal to said axis;
a plurality of balls positioned between said first holding surface and said second holding surface;
at least one roller member installed in said accommodation space; and
a biasing device which biases said movable member toward said first holding surface so that said balls are sandwiched between said first holding surface and said second holding surface and so that said roller member comes into pressing contact with said normal surface and said second normal surface,
wherein said circumferentially-uneven-width-space forming portion is shaped so that a rotation of said hollow-cylindrical rotary input shaft is transferred to said rotary output shaft via said roller member to which said rotation is applied from said normal surface when said hollow-cylindrical rotary input shaft is rotated.

15. A one-way rotational transfer mechanism comprising:
a rotary output shaft;
a hollow-cylindrical rotary input shaft positioned around said rotary output shaft to be freely rotatable relative to said rotary output shaft about an axis thereof, said hollow-cylindrical rotary input shaft having a normal surface lying in a plane normal to an axis of said hollow-cylindrical rotary input shaft;
a circumferentially-uneven-width-space forming portion formed on said hollow-cylindrical rotary input shaft to be adjacent to said normal surface to form at least one accommodation space between said hollow-cylindrical rotary input shaft and said cylindrical inner peripheral surface;
at least one roller member installed in said accommodation space; and
a magnetic biasing device which biases said hollow-cylindrical rotary input shaft along said axis thereof by a magnetic force in a direction so that said normal surface and said roller member come into pressing contact with each other,
wherein said circumferentially-uneven-width-space forming portion is shaped so that a rotation of said hollow-cylindrical rotary input shaft is transferred to said rotary output shaft via said roller member to which said rotation is applied from said normal surface when said hollow-cylindrical rotary input shaft is driven to rotate.

16. A one-way rotational transfer mechanism comprising:
a rotary output shaft;
a hollow-cylindrical rotary input shaft positioned around said rotary output shaft to be freely rotatable relative to said rotary output shaft about an axis thereof, said hollow-cylindrical rotary input shaft having a normal surface lying in a plane normal to an axis of said hollow-cylindrical rotary input shaft;
a circumferentially-uneven-width-space forming portion formed on said hollow-cylindrical rotary input shaft to be adjacent to said normal surface to form at least one accommodation space between said hollow-cylindrical rotary input shaft and said cylindrical inner peripheral surface;
at least one roller member installed in said accommodation space; and
a hydraulic biasing device which biases said hollow-cylindrical rotary input shaft along said axis thereof by a hydraulic force in a direction so that said normal surface and said roller member come into pressing contact with each other,
wherein said circumferentially-uneven-width-space forming portion is shaped so that a rotation of said hollow-cylindrical rotary input shaft is transferred to said rotary output shaft via said roller member to which said rotation is applied from said normal surface when said hollow-cylindrical rotary input shaft is rotated.

* * * * *